United States Patent
Siemianowski et al.

(10) Patent No.: US 10,160,930 B2
(45) Date of Patent: Dec. 25, 2018

(54) ELECTRO-RHEOLOGICAL FLUID AND HAPTIC DEVICE

(71) Applicant: MERCK PATENT GMBH, Darmstadt (DE)

(72) Inventors: Simon Siemianowski, Darmstadt (DE); Rachel Tuffin, Chandlers Ford (GB); Roger Kemp, Winchester (GB); Ian Charles Sage, Malvern (GB)

(73) Assignee: MERCK PATENT GMBH, Darmstadt (DE)

( * ) Notice: Subject to any disclaimer, the term of this patent is extended or adjusted under 35 U.S.C. 154(b) by 56 days.

(21) Appl. No.: 15/125,733

(22) PCT Filed: Feb. 23, 2015

(86) PCT No.: PCT/EP2015/000405
§ 371 (c)(1),
(2) Date: Sep. 13, 2016

(87) PCT Pub. No.: WO2015/135628
PCT Pub. Date: Sep. 17, 2015

(65) Prior Publication Data
US 2017/0002290 A1 Jan. 5, 2017

(30) Foreign Application Priority Data
Mar. 14, 2014 (EP) .................... 14000967

(51) Int. Cl.
| | |
|---|---|
| *G02F 1/1343* | (2006.01) |
| *G02F 1/1333* | (2006.01) |
| *G02F 1/00* | (2006.01) |
| *C10M 171/00* | (2006.01) |
| *C09K 19/30* | (2006.01) |
| *G06F 3/00* | (2006.01) |
| *C09K 19/20* | (2006.01) |
| *C09K 19/52* | (2006.01) |
| *C09K 19/04* | (2006.01) |
| *C09K 19/12* | (2006.01) |
| *C09K 19/34* | (2006.01) |

(52) U.S. Cl.
CPC ......... *C10M 171/001* (2013.01); *C09K 19/20* (2013.01); *C09K 19/3066* (2013.01); *C09K 19/3068* (2013.01); *C09K 19/3402* (2013.01); *G02F 1/0045* (2013.01); *G02F 1/133305* (2013.01); *G02F 1/134363* (2013.01); *G06F 3/00* (2013.01); *C09K 2019/0466* (2013.01); *C09K 2019/123* (2013.01); *C09K 2019/3077* (2013.01); *C09K 2019/3083* (2013.01); *C09K 2019/3422* (2013.01); *C09K 2019/521* (2013.01); *C09K 2019/523* (2013.01); *C10M 2201/04* (2013.01); *C10M 2201/062* (2013.01); *C10M 2209/084* (2013.01); *C10N 2220/06* (2013.01); *C10N 2220/082* (2013.01); *C10N 2230/06* (2013.01); *C10N 2240/20* (2013.01); *C10N 2250/12* (2013.01)

(58) Field of Classification Search
None
See application file for complete search history.

(56) References Cited

U.S. PATENT DOCUMENTS

| | | | | |
|---|---|---|---|---|
| 5,387,370 A | * | 2/1995 | Tomizawa | ......... C10M 171/001 252/299.01 |
| 2011/0253935 A1 | * | 10/2011 | Jansen | .................. C09K 19/20 252/299.61 |
| 2013/0335651 A1 | * | 12/2013 | Lee | ......................... C09K 19/12 349/33 |
| 2014/0070141 A1 | * | 3/2014 | Lietzau | ................ C07D 333/12 252/299.61 |

FOREIGN PATENT DOCUMENTS

| | | | |
|---|---|---|---|
| EP | 0567649 A1 | | 11/1993 |
| GB | 2208515 | * | 4/1989 |
| GB | 2208515 A | | 4/1989 |
| JP | H05171175 A | | 7/1993 |

OTHER PUBLICATIONS

International Search Report for PCT/EP2015/000405 dated Sep. 24, 2015.
Masayuki, G. et al., "Tactile bump display using electro-rheological fluid," 2013 IEEE/RSJ International Conference on Intelligent Robots and Systems, IEEE, Nov. 3, 2013, pp. 4478-4483.
Taylor, P. M. et al., "Advances in an electrorheological fluid based tactile array," Displays Devices, Dempa Publications, May 15, 1998, vol. 18, No. 3, pp. 135-141.
English Abstract for JPH05171175, Publication Date: Jul. 9, 1993.

* cited by examiner

*Primary Examiner* — Ryan Crockett
(74) *Attorney, Agent, or Firm* — Millen White Zelano & Branigan, PC

(57) ABSTRACT

The present invention relates to an electro-rheological fluid comprising particles of at least one inorganic or organic material suspended in a polar liquid crystalline medium, the use of such electro-rheological fluid in an haptic device, an haptic device itself, a method of the production of such haptic device and the use of such haptic device in electro-optical devices.

25 Claims, No Drawings

ELECTRO-RHEOLOGICAL FLUID AND HAPTIC DEVICE

The present invention relates to an electro-rheological fluid comprising particles of at least one inorganic or organic material suspended in a polar liquid crystalline medium, the use of such electro-rheological fluid in an haptic device, an haptic device itself, a method of the production of such haptic device and the use of such haptic device in electro-optical devices.

The electro-rheological effect was first demonstrated over forty years ago by Winslow (U.S. Pat. No. 2,417,850), who disclosed that certain suspensions, composed of a finely divided solid such as starch, limestone or its derivatives, gypsum, flour, gelatine and carbon, dispersed in a non-conducting liquid, for example lightweight transformer oil, transformer insulating fluids, olive oil or mineral oil, will manifest an increase in flow resistance as long as an electrical potential difference is applied thereto. The effect, often referred to as the "Winslow effect", was originally interpreted as an increase in viscosity and such materials were referred to as "electroviscous fluids". Subsequent investigations have however shown that the increase in flow resistance may be due not only to an increase in viscosity in the Newtonian sense, but also to an applied electric field induced Bingham plasticity. Consequently the term "electro-rheological fluid" has come into general use.

For example, electro-rheological fluids, or ER fluids, are made by suspending particles in a liquid whose dielectric constant or conductivity is mismatched in order to create dipolar particle interactions in the presence of an AC or a DC electric field. ER fluids rapidly solidify, or at least increase their viscosity dramatically, in response to an electric field, due to the formation of particle chains that bridge the electrodes.

Research has continued with a view to improving the dispersed and continuous phases of electro-rheological fluids and, as the mechanisms by which the phenomena occur are still not well understood, differing approaches have evolved. Thus some fluids rely on the presence of water associated with the dispersed phase—see for example GB 1501635 and GB 1570234, while other fluids are water-independent—see for example GB 2170510. A review of the variety of dispersed and continuous phases employed so far is to be found in a review article by Block et al. J. Phys. D. Appl. Phys. 21 (1988), 1661-1677. GB 2208515 proposes an electro-rheological fluid comprising a fluid which itself acts as the active material and which is preferably a liquid crystal material (e.g. E7). If desired, dry microscopic glass bubbles may be suspended within the fluid, the majority of the bubbles preferably having diameters between 20 and 100 microns and wall thicknesses of between 0.5 and 2 microns. Other suitable electro-rheological fluids on the basis of the same liquid-crystalline material (e.g. E7) are disclosed in GB 2259918, GB 2249553, GB 2199336.

However, these ER fluids are especially limited with respect to their nematic phase range and their polarity. In order to utilize larger forces than ER fluids based on low polarity liquid crystalline material as described above, there is a great demand for alternative ER fluids.

The millisecond response of ER fluids has piqued the interest of engineers, who are now trying to incorporate these fluids into practical fast electromechanical actuators, such as fibre spinning clutches and active shock absorbers. Other applications are for instance haptic devices, which are described by P. M. Taylor, D. M. Pollet, A. Hosseini-Sianaki, C. J. Varley, Displays 18 (1998) 135-14, or disclosed in GB 2265746; U.S. Pat. No. 5,222,895; U.S. Pat. No. 5,496,174; and US 2005/0285846 A.

Taylor et al describe a device wherein the ER fluid is sandwiched between two conductive substrates, one of which is a flexible conductive rubber sheet. Preferably, a fabric layer is placed between the substrates, along with the ER fluid; the authors indicate that increased actuation force and lower power consumption can be achieved by use of the fabric layer which may also help prevent electrical contact and short circuit between the substrates when the device is used.

GB 2265746 describes a similar structure, with the exception that the upper and lower electrodes are separated by an electrically insulating mesh.

US 2005/0285846 describes a device structure, which includes a photoconductive layer so that the pattern generated on the haptic display may be directly modulated by light from an underlying electro-optic display. Modulation via a touch screen is also proposed. US 2005/0285846 further proposes the use of transparent thin film upper and lower substrates but does not offer any solution to the problem of short circuit between the two electrode layers, or durability of the electrodes on the flexible substrate. Moreover, the device of US 2005/0285846 retains the key disadvantages brought about by use of two electrically conductive substrates.

U.S. Pat. No. 5,222,895 describes a quite different design of ER based haptic display. The device described comprises an array of holes in a rigid board, filled with ER fluid. Each hole is equipped with electrodes and is capped with a flexible membrane. Information can be read from the display by directly sensing deformation of this membrane or by causing motion of the membrane to displace a pin which serves as the tactile cue. In operation, the ER fluid is to be pumped into a subset of the holes representing an image or information, thereby distorting the membrane. These holes will then have their electrodes activated, creating a valve based on the ER effect and holding the information static on the display without further pumping. This device avoids the problems which arise in Taylor et al from the use of a flexible conducting substrate. However, operation of the device disclosed in U.S. Pat. No. 5,222,895 requires an ancillary pumping mechanism which can be selectively applied to the fluid in each hole which is to be addressed. The structure is relatively complex and requires additional power and structures to perform the pumping stage of display addressing. The device contains several layers and optically inhomogeneous structures and the author does not suggest that it may be made transparent. Further shortcomings of the device described in U.S. Pat. No. 5,222,895 are disclosed by Garner et al in U.S. Pat. No. 5,496,174 who points out that manufacture of the electrode structures described in U.S. Pat. No. 5,222,895 will rely on difficult and costly non-standard processes.

U.S. Pat. No. 5,496,174 describes a haptic display based on an array of holes in a board, capped with a flexible membrane. In this disclosure, an ER fluid is pumped between a common ground electrode and a series of addressable electrodes. Actuation of these latter electrodes in a suitable pattern leads to an increase in viscosity of the flowing ER fluid which consequently is forced into nearby holes, displacing the membrane. The displaced membrane can be sensed directly or used to displace pins as before. Thus, the device described in U.S. Pat. No. 5,496,174 requires ancillary means for pumping the ER fluid through the system, adding to the complexity and power requirement of the device. Like the device described in U.S. Pat. No. 5,222,895, it comprises multiple optically inhomogeneous layers and there is no indication that it can be made transparent.

In summary, the devices of prior art exhibit the following drawbacks two conductive substrates are used, which adds extra costs;

the two substrates may be pushed into contact by excessive pressure, short-circuiting the device and preventing its proper operation;

the need to maintain separation of the substrates requires a large separation between them (2.5-1.3 mm) and thus, requires a high operating voltage of about 3000V;

the conducting rubber layer used as a flexible electrode makes it extremely difficult to achieve a robust, transparent device;

the need of a fabric layer or other means for maintaining separation of the substrates, further reduces the transparency of the device; and the use of a conducting rubber layer as one electrode, leads to interaction between this layer and liquid crystal based ER fluids, whereby an additional conductive barrier must be used in this case, reducing the flexibility of the layer and the ease with which tactile areas can be sensed.

Consequently, there is still the need for alternative ER fluids and haptic devices and, which do not have the drawbacks of prior art devices or have them to a lesser extent and which in particular should have only one patterned conductive substrate, exhibit a minimized possibility of short circuits, have a favourable ER fluid layer thicknesses, utilize an optimized electrode spacing, which reduces the operating voltage, utilize a favourable thin, highly transparent upper layer, do not require a fabric or other spacer layer, utilize a wide choice of inexpensive polymers as substrates, which do not interact with ER fluids, and which be suitable for mass production.

Other aims of the present invention are immediately evident to the person skilled in the art from the following detailed description.

SUMMARY OF THE INVENTION

Surprisingly, the inventors have found that one or more of the above-described problems can be solved by a device comprising an electro-rheological fluid sandwiched between two substrates, at least one of said substrates being flexible, and one of said substrates being provided with an electrode structure adjacent to the electro-rheological fluid and having a significant component of the electrical field parallel with respect to the substrate main plane.

Thus the present invention relates to a device as described above and below.

Furthermore, the present invention relates to a method of production of such a device comprising at least the step of providing a layer of an electro-rheological fluid onto a substrate, which is provided with an electrode structure as described above and below.

The entire device may be fabricated as a thin and lightweight structure which can be attached to electro-optic displays or used as a standalone unit, therefore the invention also relates to the use of the device for providing a electromechanical effect, which can be sensed by a fingertip or stylus, in particular the use in an electro-optical device.

Accordingly, the present invention also relates to electro-optical device comprising the device as described above and below, in particular to haptic displays.

In summary, the device structure according to the present invention has a number of advantages:

The electrode structure can be readily fabricated on the substrate by well-established processes such as photolithographic etching, and may be made highly transparent as required for use above a display. Electrodes are required on only one surface, reducing the manufacturing cost of the device. The simple structure, low power consumption, light and compact construction of the device according to the present invention makes it ideal especially for use in portable equipment, such as laptops, handhelds, mobile phones, navigation systems etc.

The present invention also relates to specific ER fluids as described below comprising at least particles of at least one inorganic or organic material suspended in a polar liquid crystalline medium, the use of such ER fluids in a device as described above and below, and to a method of its production.

Terms and Definitions

The term "liquid crystal (LC)" relates to materials having liquid crystalline mesophases in some temperature ranges (thermotropic LCs) or in some concentration ranges in solutions (lyotropic LCs). They obligatorily contain mesogenic compounds.

The terms "mesogenic compound" and "liquid crystal compound" mean a compound comprising one or more calamitic (rod- or board/lath-shaped) or discotic (disk-shaped) mesogenic groups. The term "mesogenic group" means a group with the ability to induce liquid crystalline phase (or mesophase) behaviour.

The compounds comprising mesogenic groups do not necessarily have to exhibit a liquid-crystalline mesophase themselves. It is also possible that they show liquid-crystalline mesophases only in mixtures with other compounds, or when the mesogenic compounds or materials, or the mixtures thereof.

A calamitic mesogenic group is usually comprising a mesogenic core consisting of one or more aromatic or non-aromatic cyclic groups connected to each other directly or via linkage groups, optionally comprising terminal groups attached to the ends of the mesogenic core, and optionally comprising one or more lateral groups attached to the long side of the mesogenic core, wherein these terminal and lateral groups are usually selected e.g. from carbyl or hydrocarbyl groups, polar groups like halogen, nitro, hydroxy, etc.

For the purposes of the present application, the term in-plane electric field is taken to mean employing an AC or DC electrical field substantially parallel to the substrates, respectively the ER fluid layer.

Light in the context of this application is taken to mean electromagnetic radiation that has wavelength in a range from about 400 nm to about 740 nm. Ultraviolet (UV) light is electromagnetic radiation with a wavelength in a range from about 200 nm to about 450 nm.

The term "transparent" in the context of this application is taken to mean that the transmission of light through the device is at least 65% of the incident light, more preferably at least 80%, even more preferably at least 90%.

All temperatures, such as, for example, the melting point $T(C,N)$ or $T(C,S)$, the transition from the smectic (S) to the nematic (N) phase $T(S,N)$ and the clearing point $T(N,I)$ of the liquid crystals, are quoted in degrees Celsius. All temperature differences are quoted in differential degrees. The term "clearing point" means the temperature at which the transition between the mesophase with the highest temperature range and the isotropic phase occurs.

Throughout this application, unless explicitly stated otherwise, all concentrations are given in weight percent and relate to the respective complete mixture, all temperatures are given in degrees centigrade (Celsius) and all differences of temperatures in degrees centigrade. All physical properties have been and are determined according to "Merck Liquid Crystals, Physical Properties of Liquid Crystals", Status November 1997, Merck KGaA, Germany and are given for a temperature of 20° C., unless explicitly stated otherwise. The optical anisotropy (Δn) is determined at a wavelength of 589.3 nm.

The optical anisotropy Δn is defined as follows $$\Delta n = n_e - n_o \quad (1)$$

wherein $n_e$ is the extraordinary refractive index and $n_o$ is the ordinary refractive index, and the average refractive index $n_{av.}$ is given by the following equation:

$$n_{av.} = ((2n_o^2 + n_e^2)/3)^{1/2} \quad (2)$$

The average refractive index $n_{av.}$ and the ordinary refractive index $n_o$ can be measured using an Abbe refractometer. Δn can then be calculated from the above equations.

In the present application, the expression dielectrically positive describes compounds or components where Δε>3.0, dielectrically neutral describes those where −1.5≤Δε≤3.0 and dielectrically negative describes those where Δε<−1.5. Δε is determined at a frequency of 1 kHz and at 20° C. The dielectric anisotropy of the respective compound is determined from the results of a solution of 10% of the respective individual compound in a nematic host mixture. If the solubility of the respective compound in the host mixture is less than 10%, the concentration is reduced to 5%. The capacitances of the test mixtures are determined both in a cell having homeotropic alignment and in a cell having homogeneous alignment. The cell thickness of both types of cells is approximately 20 μm. The voltage applied is a rectangular wave having a frequency of 1 kHz and an effective value of typically 0.5 V to 1.0 V, but it is always selected to be below the capacitive threshold of the respective test mixture.

Δε is defined as $(\varepsilon_\parallel - \varepsilon_\perp)$, while $\varepsilon_{ave.}$ is $(\varepsilon_\parallel + 2\varepsilon_\perp)/3$.

The host mixture used for dielectrically positive compounds is mixture ZLI-4792 and that used for dielectrically neutral and dielectrically negative compounds is mixture ZLI-3086, both from Merck KGaA, Germany. The absolute values of the dielectric constants of the compounds are determined from the change in the respective values of the host mixture on addition of the compounds of interest. The values are extrapolated to a concentration of the compounds of interest of 100%.

In case of doubt the definitions as given in C. Tschierske, G. Pelzl and S. Diele, Angew. Chem. 2004, 116, 6340-6368 shall apply.

DETAILED DESCRIPTION

In a preferred embodiment, the electrode structure adjacent to the electro-rheological fluid and having a significant component of the electrical field parallel with respect to the substrate main plane corresponds to an in-plane electrode structure. The in-plane electrode structure is so constituted that the electric field is applied to the adjacent electro-rheological fluid layer substantially in parallel with respect to the substrate main plain.

In a further preferred embodiment, the in-plane electrode structure is selected from interdigitated electrodes, IPS electrodes, FFS electrodes or comb like electrodes, preferably interdigitated electrodes or comb like electrodes. In this connection, document WO 2008/104533 A1 describes arrangements where the electrodes are arranged as an IPS electrode and arrangements where an additional base electrode is disposed on the same substrate, as a fringe-field switching (FFS) electrode.

Suitable electrode materials are commonly known to the expert, as for example electrodes made of metal or metal oxides, such as, for example transparent indium tin oxide (ITO), which is preferred according to the present invention.

The spacing between the electrodes is preferably in the range from approximately 1 μm to approximately 1000 μm, more preferably in the range from approximately 10 μm to approximately 500 μm, and even more preferably in the range from approximately 10 μm to approximately 100 μm, in particular in the range from approximately 10 μm to approximately 50 μm.

Preferably, the electrodes of the device are associated with a switching element, such as a thin film transistor (TFT) or thin film diode (TFD).

Preferably, the driving voltage is in the range from 100 to 800 V, more preferably in the range from 150 to 600 V, even more in the range from 200 to 400 V.

The applied electric field strengths are typically higher than approximately 1 V/μm$^{-1}$, preferably higher than approximately 2 V/μm$^{-1}$ and more preferably higher than approximately 3 V/μm$^{-1}$.

In a preferred embodiment, the electrode structure is preferably placed on the lower substrate and is therefore protected from mechanical damage. Unless the entire display assembly is intended to be flexible, preferably the electrodes may be formed on a low cost rigid substrate, which will further increase the durability of the device. In accordance with the invention, such substrate may consist of a polymeric material, of metal oxide, for example ITO and of glass, preferably glass or ITO, and in particular glass.

The upper polymer cover sheet may comprise a robust but highly flexible polymer such as poly(ethylene terephthalate) (PET), polyolefin, polyester or other low cost polymers. This sheet may also carry additional functional layers such as anti-reflection coatings, self-cleaning or dirt-shedding layers, printed legends and the like. Preferably for use in a haptic display, at least some areas of the polymer sheet are, suitable thin to experience an haptic effect and highly transparent, while coloured or scattering films may also be used provided they allow some light through make the underlying display visible.

In a preferred embodiment, the substrates are initially arranged with a separation in the range from approximately 10 μm to approximately 1000 μm from one another, preferably in the range from approximately 20 μm to approximately 800 μm from one another, and more preferably in the range from approximately 30 μm to approximately 500 μm from one another. The layer of the ER fluid is thereby located in the interspace.

The substrate layers can be kept at a defined separation from one another, for example, by spacers or electrodes, which extend through the full cell thickness or projecting structures in the layer. Typical spacer materials are commonly known to the expert, as for example spacers made of plastic, silica, epoxy resins, etc.

The simplicity of the device allows fabrication at low cost, and allows a wide choice of ER fluids to be used without any compatibility problems between this fluid and the other components of the display.

A typical process for the production of a device according to the invention comprises i.a. the following steps:
cutting and cleaning the lower substrate, on which the electrodes are arranged,
providing a layer of the ER fluid onto the substrate,
providing the upper, flexible substrate onto it, and
assembling the cell using a UV curable adhesive.

The device of the present invention can be used as a standalone unit or used in various types of optical and electro-optical devices.

Said optical and electro optical devices include, without limitation electro-optical displays, liquid crystal displays (LCDs), non-linear optic (NLO) devices, and optical information storage devices.

However, in a preferred embodiment the device according to the present invention comprises an electro-rheological fluid, which is selected from a binary solid-liquid phase mixture, preferably, a mixture comprising particles of at least one inorganic or organic material corresponding to the solid phase and at least one liquid-crystalline compound, which corresponds to the liquid phase.

Suitable particle sizes are in the range from 1 nm to 1000 nm, more preferably in the range from 1 nm to 500 nm, even more preferably in the range from 1 nm to 250 nm.

Such ER fluid may comprise a wide variety of particulate dispersions in liquid crystalline fluids or in isotropic dielectric liquids. A suitable and preferred electro-rheological fluid comprises particles of at least one inorganic or organic material suspended in a polar liquid crystalline medium.

Suitable materials utilized for the particles in the ER fluid are selected from materials exhibiting a permittivity $\varepsilon$ of at least 1 more preferably of at least 2 and even more preferably of at least 3.

The permittivity of a material describes how much electric flux is 'generated' per unit charge in that material. More electric flux exists in a material with a high permittivity (per unit charge) because of polarization effects. Permittivity is directly related to electric susceptibility, which is a measure of how easily a dielectric polarizes in response to an electric field. Thus, permittivity relates to a material's ability to transmit (or "permit") an electric field. In SI units, permittivity $\varepsilon$ is measured in farads per meter (F/m); electric susceptibility $\chi$ is dimensionless. They are related to each other through $$\varepsilon = \varepsilon_r \varepsilon_0 = (1+\chi)\varepsilon_0$$

where $\varepsilon_r$ is the relative permittivity of the material, and $\varepsilon_0 = 8.8541878176 \times 10^{-12}$ F/m is the vacuum permittivity.

In a preferred embodiment suitable particles are selected from particles of an inorganic material such as for example amorphous silicon and $TiO_2$. In a likewise preferred embodiment suitable particles are selected from particles of an organic material such as PMMA, LiPMAC and styrene.

In a preferred embodiment of the present invention, the amount of particles in the electro-rheological fluid as a whole is in the range from 5 to 70% wt, more preferably in the range from 8 to 60% wt, even more preferably in the range from 10 to 40% wt.

A suitable ER fluid in accordance with the present invention comprises 2 or more, preferably at least 3, particularly preferably at least 4 and very particularly preferably at least 5, different liquid-crystalline compounds, which form the liquid crystalline component of the ER fluid.

In a preferred embodiment of the present invention, the ER fluid comprises an amount of the liquid-crystalline component, with respect to the electro-rheological fluid as a whole, in the range from 2 to 95% wt, more preferably in the range from 5 to 90% wt, even more preferably in the range from 10 to 80% wt.

In the following conditions for the liquid-crystalline component according to preferred embodiments of the present invention are given. These preferred conditions may be fulfilled individually or, preferably in combinations with each other. Binary combinations thereof are preferred, whereas ternary or higher combinations thereof are particularly preferred.

In accordance with the invention, the liquid-crystalline component preferably exhibits positive values for the dielectric anisotropy $\Delta\varepsilon$. In this case, $\Delta\varepsilon$ preferably has a value of $\geq 5$, more preferably $\geq 10$, even more preferably $\geq 25$, especially $\geq 100$, and in particular of $\geq 200$.

The liquid-crystal component in accordance with the present invention preferably have a clearing point of approximately 55° C. or more, more preferably approximately 60° C. or more, still more preferably 65° C. or more, particularly preferably approximately 70° C. or more and very particularly preferably approximately 75° C. or more.

The liquid-crystal component in accordance with the present invention preferably exhibits a nematic phase. The nematic phase preferably extends at least from approximately 0° C. or less to approximately 65° C. or more, more preferably at least from approximately -20° C. or less to approximately 70° C. or more, very preferably at least from approximately -30° C. or less to approximately 70° C. or more and in particular at least from approximately -40° C. or less to approximately 90° C. or more. In individual preferred embodiments, it may be necessary for the nematic phase of the media according to the invention to extend to a temperature of approximately 100° C. or more and even to approximately 110° C. or more.

In a preferred embodiment of the present invention, the liquid-crystalline component comprises one or more mesogenic compounds, which are selected from the group of compounds of formula I and/or I*,

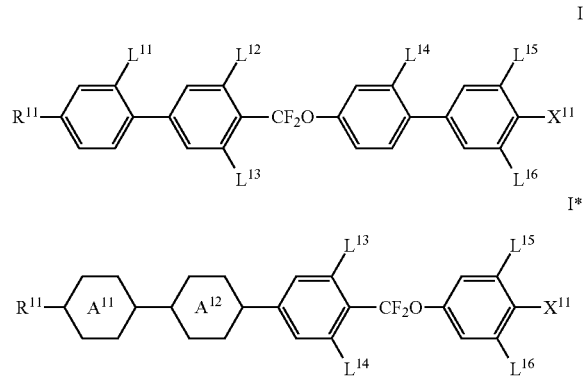

wherein
$L^{11}$ to $L^{16}$ are independently of each other H or F,

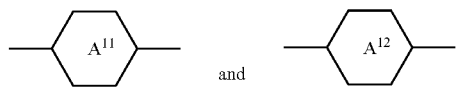

are independently of each other,

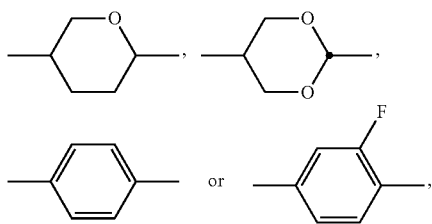

preferably

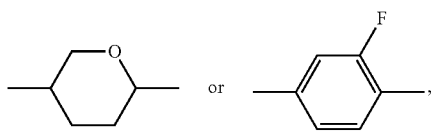

$R^{11}$ is alkyl group, which is straight chain or branched, is unsubstituted, mono- or poly-substituted by F, Cl or CN, preferably by F, and in which one or more $CH_2$ groups are optionally replaced, in each case independently from one another, by —O—, —S—, —$NR^{O1}$—, —$SiR^{O1}R^{O2}$—, —CO—, —COO—, —OCO—, —OCO—O—, —S—CO—, —CO—S—, —$CY^{O1}$=$CY^{O2}$— or —C≡C— in such a manner that O and/or S atoms are not linked directly to one another, $Y^{O1}$ and $Y^{O2}$ are, independently of each other, F, Cl, or CN, and alternatively one of them may be H, $R^{O1}$ and $R^{O2}$ are, independently of each other, H, or alkyl with 1 to 12C-atoms, $X^{11}$ halogen, CN, a mono-, di- or polyhalogenated alkyl-, or alkoxy group having 1 to 6C-atoms or a mono-, di- or polyhalogenated alkenyl group having 2 to 6C-atoms, preferably F, Cl, CN, $CF_3$, $CHF_2$, $OCF_3$, $OCFHCF_3$, $OCFHCHF_2$, $OCF_2CH_3$, $OCF_2CHF_2$, $OCF_2CF_2CHF_2$, $OCFHCF_2CF_3$, $OCFHCF_2CHF_2$, $OCF_2CF_2CF_3$, $OCF_2CF_2CClF_2$, $OCClFCF_2CF_3$ or $CH=CF_2$.

In a preferred embodiment of the present invention the liquid-crystalline component of the ER fluid comprises one more compounds of formula I, preferably selected from the group of compounds of its sub-formulae I-1 and I-2, preferably of formula I-2,

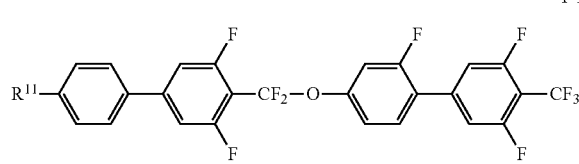

1-1

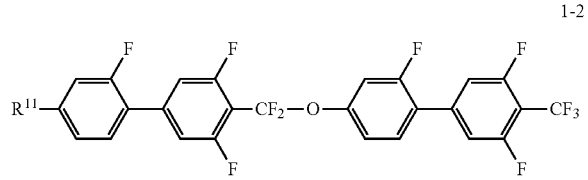

1-2 wherein $R^{11}$ has the meaning given under formula I above and preferably is n-alkyl, most preferably ethyl, n-propyl, n-butyl, n-pentyl, or n-hexyl.

In a preferred embodiment of the present invention the liquid-crystalline component of the ER fluid comprises one more compounds of formula I*, preferably selected from the group of compounds of its sub-formulae I*-1 to I*-8,

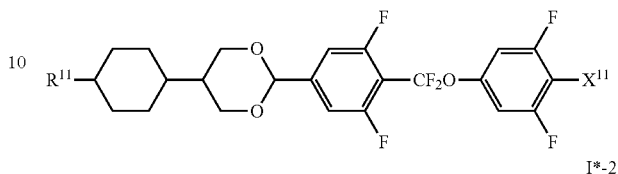

I*-1

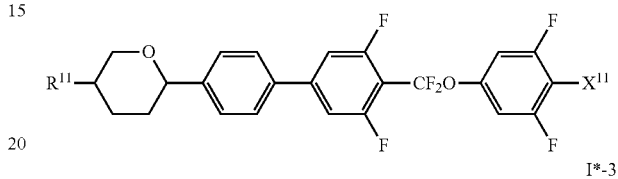

I*-2

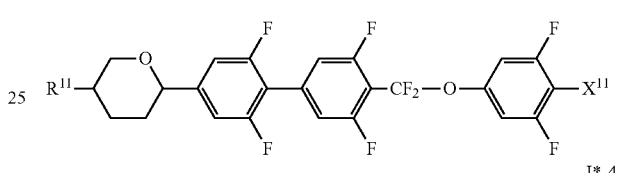

I*-3

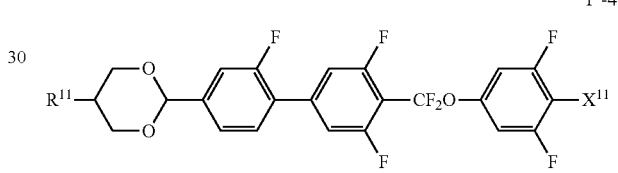

I*-4

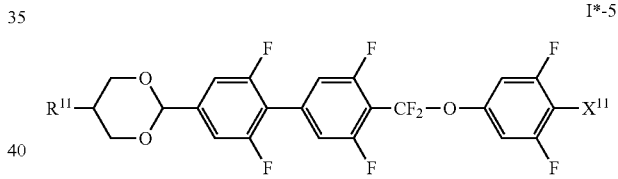

I*-5

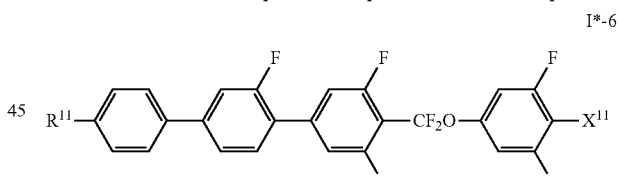

I*-6

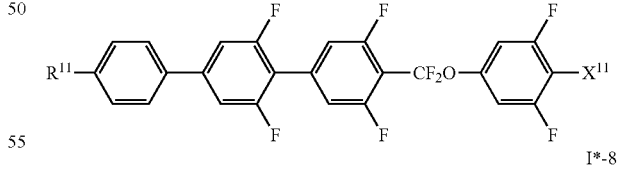

I*-7

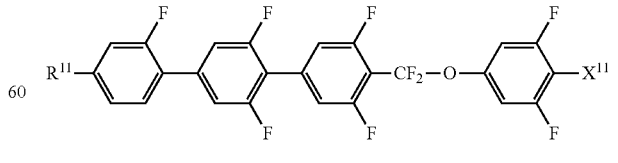

I*-8 wherein $R^{11}$ has one of the meanings given above under formula I and preferably is n-alkyl, most preferably ethyl, n-propyl, n-butyl, n-pentyl, or n-hexyl, and $X^{11}$ has one of the meanings given above under formula I and preferably is F, CN, $CF_3$ $OCHF_2$ or $OCF_3$.

In a preferred embodiment of the present invention, the liquid-crystalline component of the ER fluid comprises one or more compounds of formula II

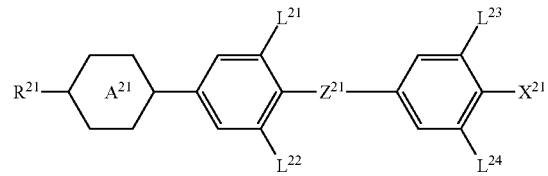

II $L^{21}$ to $L^{24}$ are independently of each other H or F, $R^{21}$ has one of the meanings as indicated above for $R^{11}$ in formula I,

denotes a diradical group selected from the following groups:
  a) the group consisting of trans-1,4-cyclohexylene, 1,4-cyclohexenylene and 1,4'-bicyclohexylene, in which, in addition, one or more non-adjacent $CH_2$ groups may be replaced by —O— and/or —S— and in which, in addition, one or more H atoms may be replaced by F,
  b) the group consisting of 1,4-phenylene and 1,3-phenylene, in which, in addition, one or two CH groups may be replaced by N and in which, in addition, one or more H atoms may be replaced by F, $Z^{21}$ is —COO—, —OCO— or —$CF_2O$—, and $X^{21}$ denotes halogen, CN, a mono- or polyhalogenated alkyl-, or alkoxy group having 1 to 6C-atoms or a mono- or polyhalogenated alkenyl group having 2 to 6 C-atoms, preferably F, Cl, CN, $CF_3$, $CHF_2$, $OCF_3$, $OCFHCF_3$, $OCFHCHF_2$, $OCF_2CH_3$, $OCF_2CHF_2$, $OCF_2CF_2CHF_2$, $OCFHCF_2CF_3$, $OCFHCF_2CHF_2$, $OCF_2CF_2CF_3$, $OCF_2CF_2CClF_2$, $OCClFCF_2CF_3$ or $CH=CF_2$, particular preferably F, CN or $CF_3$.

In a preferred embodiment of the present invention, the liquid-crystalline component of the ER fluid comprises one more compounds of formula II selected from the group of compounds of formulae II-1 to II-5

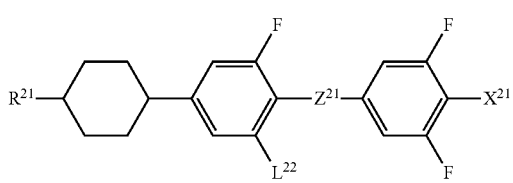

II-1

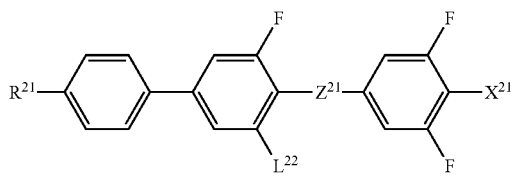

II-2

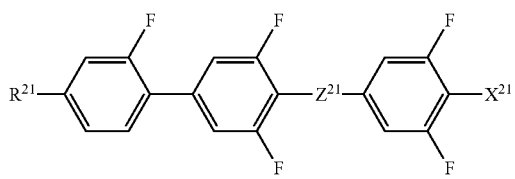

II-3

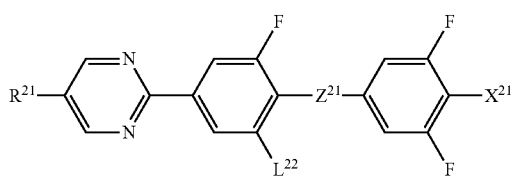

II-4

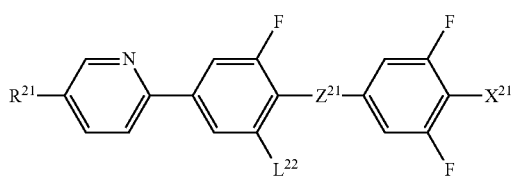

II-5 wherein the parameters have one of the meanings as indicated under formula II.

In a preferred embodiment of the present invention the liquid-crystalline component of the ER fluid the compounds of formula II-1 to II-5 are preferably selected from the group of compounds of the sub-formulae II-1a to II-5f, more preferably from the group of compounds of formula II-3-c and/or II-2f,

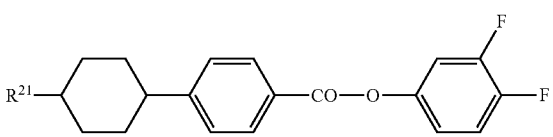

II-1a

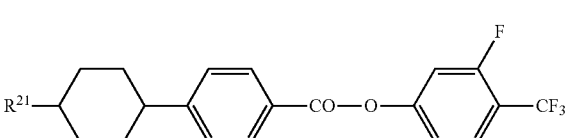

II-1b

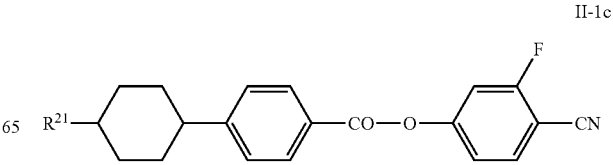

II-1c

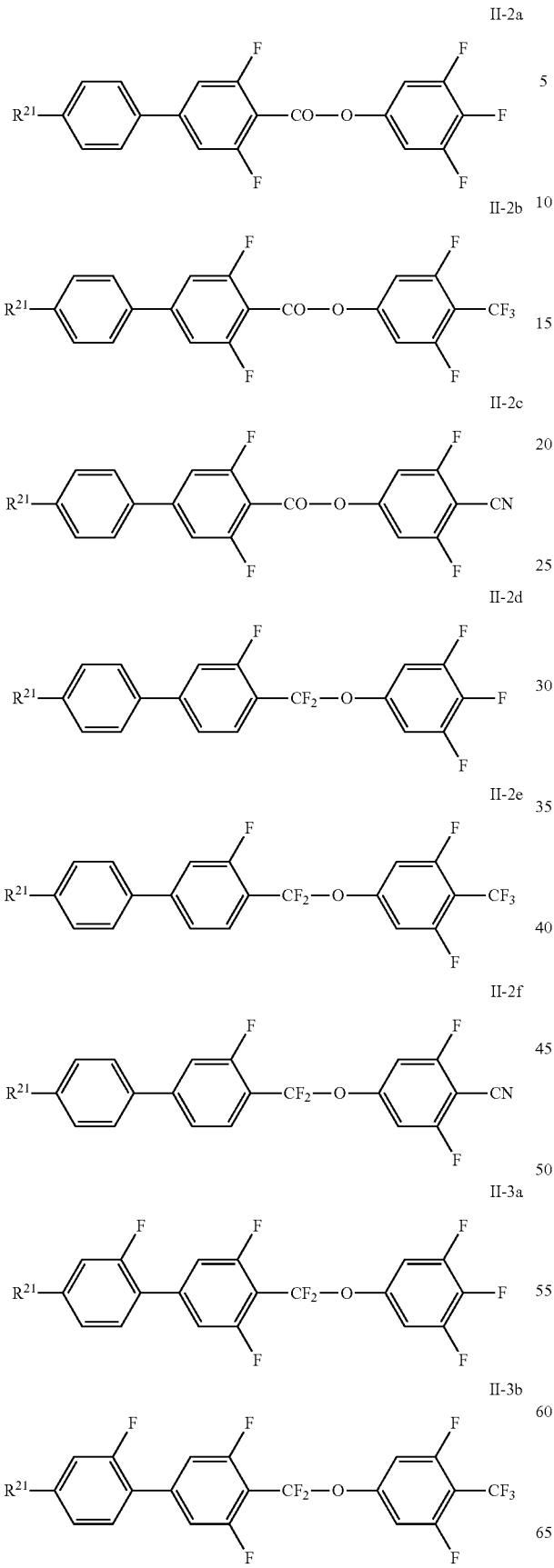

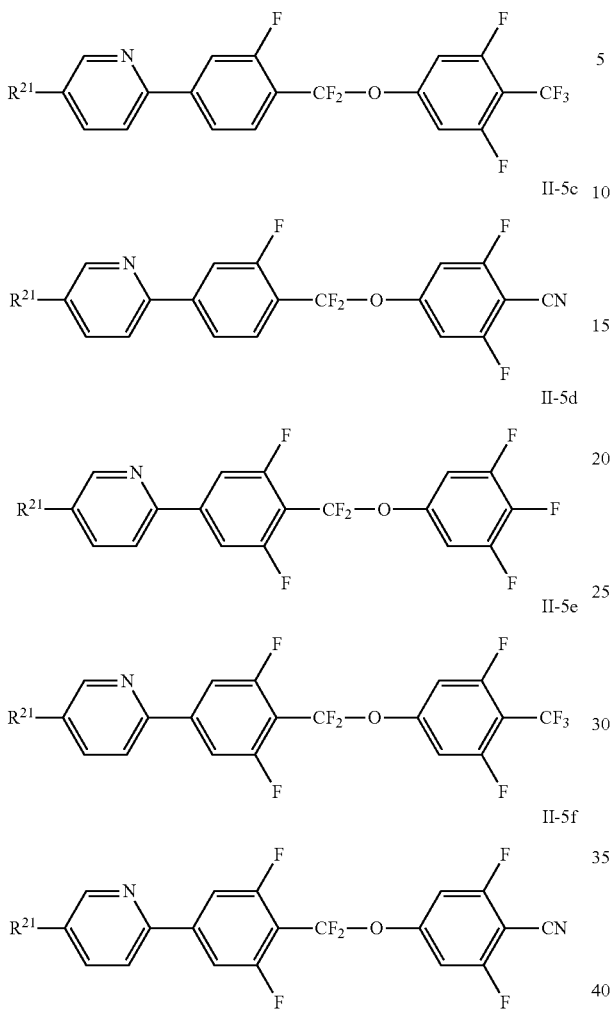

wherein $R^{21}$ has one of the meanings as indicated above in formula II and preferably is n-alkyl, most preferably ethyl, n-propyl, n-butyl, n-pentyl or n-hexyl.

In a another embodiment of the present invention, the liquid-crystalline component of the ER fluid comprises one or more compounds of formula III,

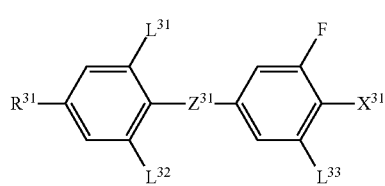

wherein
$L^{31}$ to $L^{33}$ are independently of one another H or F,
$Z^{31}$ is —COO— or —CF$_2$O—,
$R^{31}$ is an alkyl group, which is straight chain or branched, is unsubstituted, mono- or poly-substituted by F, Cl or CN, preferably by F, and in which one or more CH$_2$ groups are optionally replaced, in each case independently from one another, by —O—, —S—, —NR$^{01}$—, —SiR$^{01}$R$^{02}$—, —CO—, —COO—, —OCO—, —OCO—O—, —S—CO—, —CO—S—, —CY$^{01}$=CY$^{02}$— or —C≡C— in such a manner that O and/or S atoms are not linked directly to one another,
$Y^{01}$ and $Y^{02}$ are, independently of each other, F, Cl or CN, and alternatively one of them may be H, and
$R^{01}$ and $R^{02}$ are, independently of each other, H or alkyl with 1 to 12 C-atoms, and
$X^{31}$ denotes halogen, CN, a mono- or polyhalogenated alkyl-, or alkoxy group having 1 to 6C-atoms or a mono- or polyhalogenated alkenyl group having 2 to 6 C-atoms, preferably F, Cl, CN, CF$_3$, CHF$_2$, OCF$_3$, OCFHCF$_3$, OCFHCHF$_2$, OCF$_2$CH$_3$, OCF$_2$CHF$_2$, OCF$_2$CF$_2$CHF$_2$, OCFHCF$_2$CF$_3$, OCFHCF$_2$CHF$_2$, OCF$_2$CF$_2$CF$_3$, OCF$_2$CF$_2$CClF$_2$, OCClFCF$_2$CF$_3$ or CH=CF$_2$, particular preferably F, CN or CF$_3$.

In a further preferred embodiment the compounds of formula III are preferably selected from compounds of formulae III-1 and/or III-2

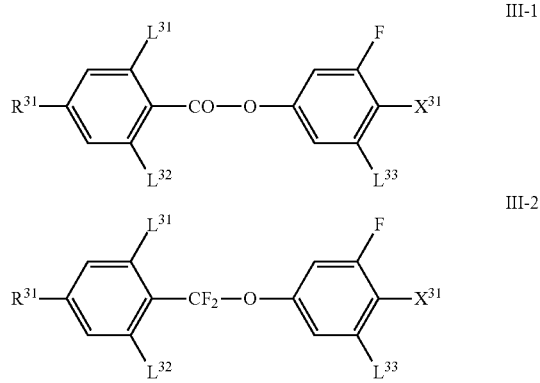

wherein the parameters $R^{31}$, $L^{31}$ to $L^{33}$ and $X^{31}$ have one of corresponding meanings given above in formula III.

In another preferred embodiment of the present invention, the liquid-crystalline component of the ER fluid comprises one or more compounds of formula III-1 selected from the group of compounds of its sub-formulae III-1a to III-1d, more preferably of the compounds of formula III-1a

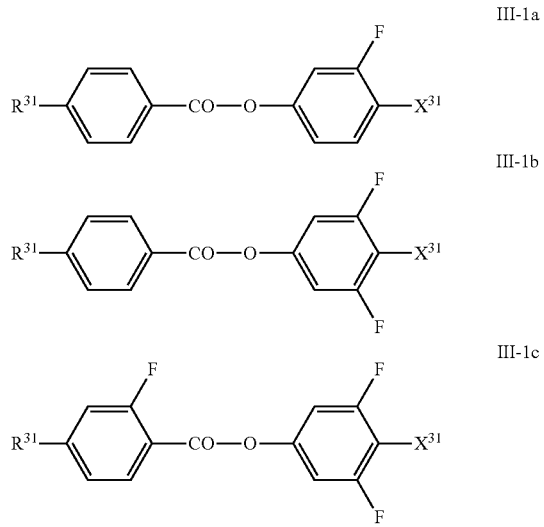

-continued

III-1d

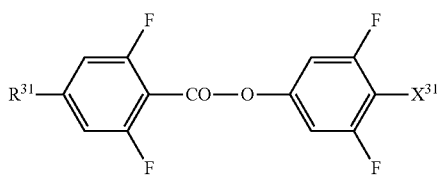

wherein $R^{31}$ and $X^{31}$ have one of the meanings given under formula III above.

In an especially preferred embodiment of the present invention the liquid-crystalline component of the ER fluid medium comprises one more compounds of formula III-1a to III-1d, which are preferably selected from the group of compounds of the following sub-formulae III-1a-1

III-1a-2

III-1a-3

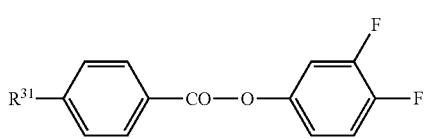

III-1b-1

III-1b-2

III-1b-3

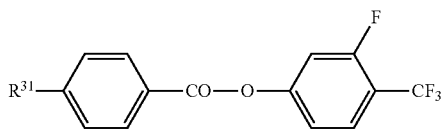

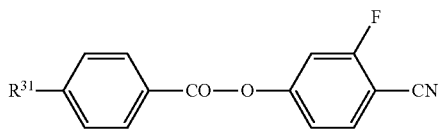

III-1c-1

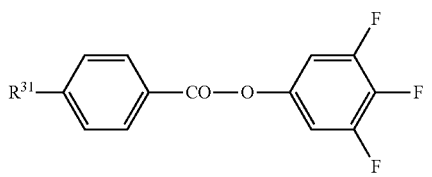

-continued

III-1c-2

III-1c-3

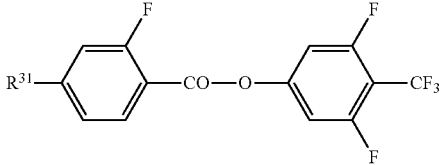

III-1d-1

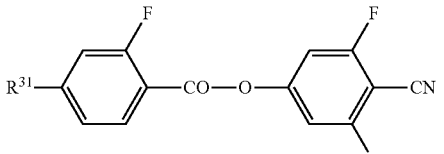

III-1d-2

III-1d-3

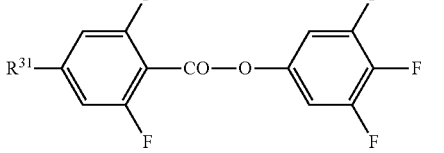

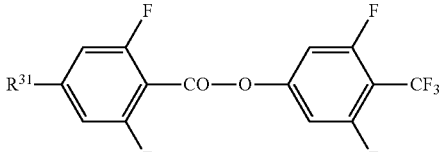

wherein $R^{31}$ has the meaning given under formula III above and preferably is n-alkyl, most preferably ethyl, n-propyl, n-butyl, n-pentyl or n-hexyl.

In another preferred embodiment of the present invention the liquid-crystalline component of the ER fluid comprises one or more compounds of formula III-2 selected from the group of compounds of its sub-formulae III-2a to III-2d, III-2a III-2b III-2c

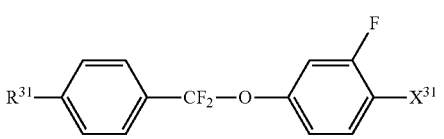

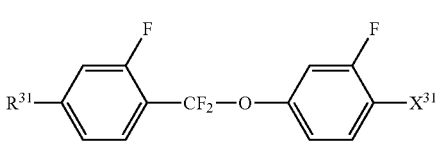

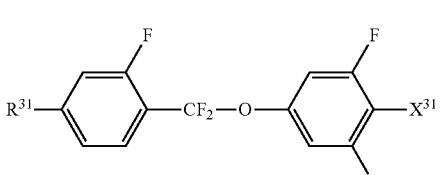

III-2d

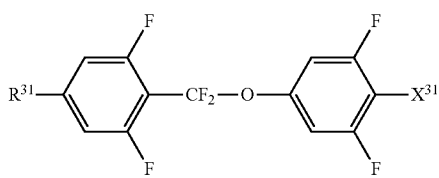

wherein $R^{31}$ and $X^{31}$ have one of the meanings given under formula III above.

In an especially preferred embodiment of the present the liquid-crystalline component of the ER fluid comprises one more compounds of formula III-2a to III-2d, which are preferably selected from the group of compounds of the following sub-formulae III-2a-1

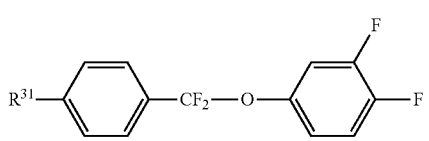

III-2a-2

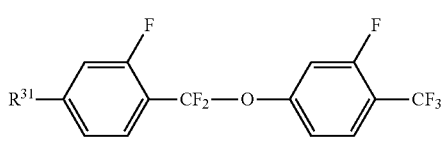

III-2a-3

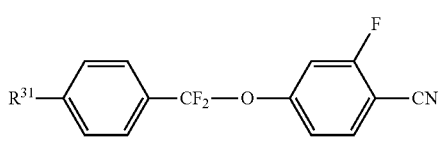

III-2b-1

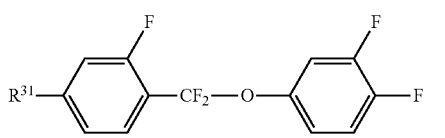

III-2b-2

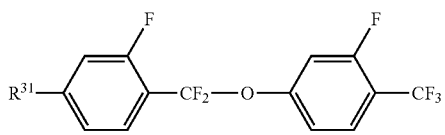

III-2b-3

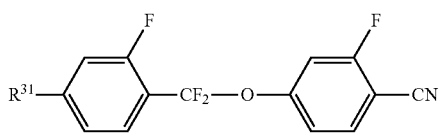

III-2c-1

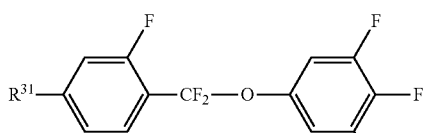

III-2c-2

III-2c-3

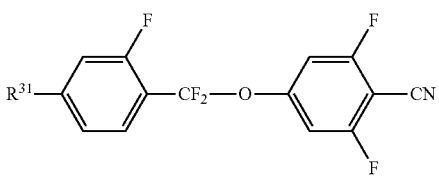

III-2d-1

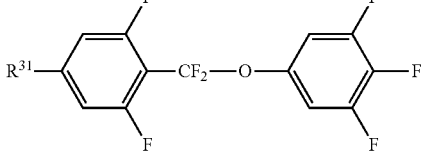

III-2d-2

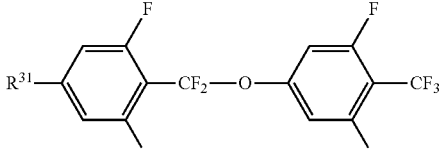

III-2d-3 wherein $R^{31}$ has the meaning given under formula III above and preferably is n-alkyl, most preferably ethyl, n-propyl, n-butyl, n-pentyl or n-hexyl.

In a preferred embodiment, the liquid-crystalline component of the ER fluid according to the present invention comprises one more compounds of formula IV

IV

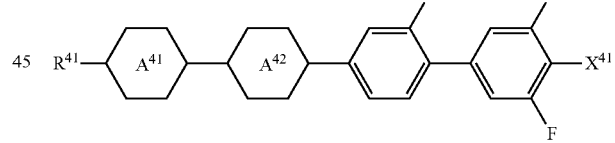

wherein $R^{41}$ has one of the meanings given for $R^{11}$ under formula I above,

 and 

are independently of each other

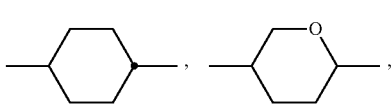

-continued

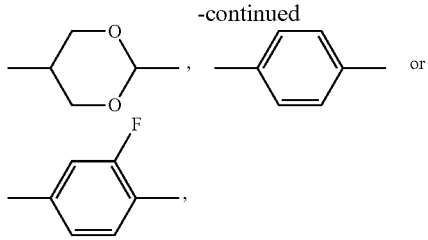

preferably

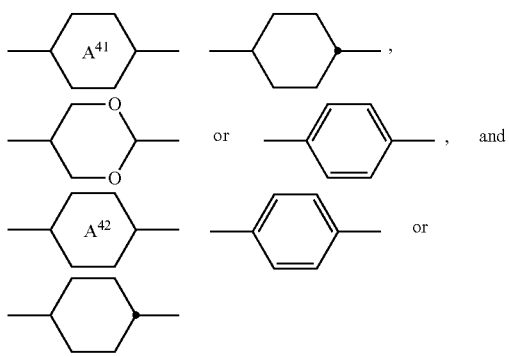

$X^{41}$ denotes F or $CF_3$, preferably F.

In a preferred embodiment of the present invention the liquid-crystalline component of the ER fluid comprises one more compounds of formula IV, preferably selected from the group of compounds of its sub-formulae IV-1 to IV-4, IV-1
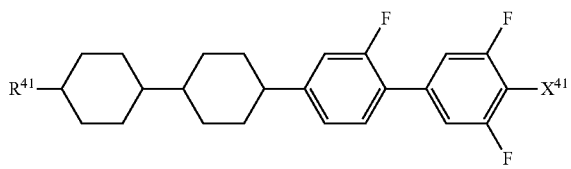

IV-2
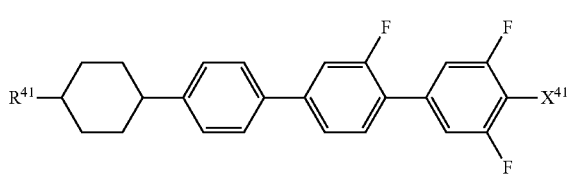

IV-3
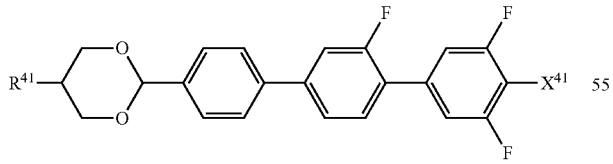

IV-4
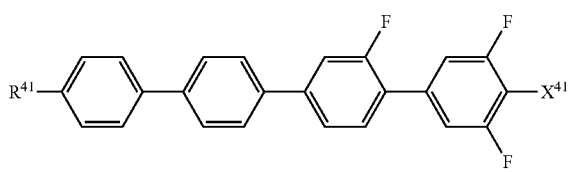

$R^{41}$ has one of the meanings given for $R^{11}$ under formula I above, $X^{41}$ denotes F or $CF_3$, and in IV-1, IV-3 and IV-4 preferably F.

In a preferred embodiment of the present invention, the liquid-crystalline component of the ER fluid comprises one more compounds of formula V, V
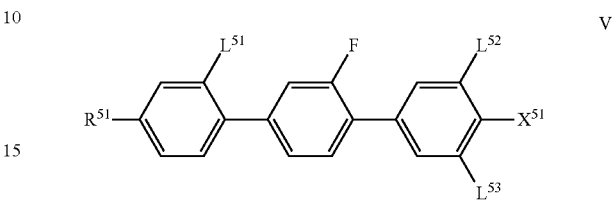

wherein
$L^{51}$ to $L^{53}$ are, independently of each other, H or F
$R^{51}$ is an alkyl group, which is straight chain or branched, preferably has 1 to 20C-atoms, is unsubstituted, mono- or poly-substituted by F, Cl or CN, preferably by F, and in which one or more $CH_2$ groups are optionally replaced, in each case independently from one another, by —O—, —S—, —$NR^{01}$—, —$SiR^{01}R^{02}$—, —CO—, —COO—, —OCO—, —OCO—O—, —S—CO—, —CO—S—, —$CY^{01}$=$CY^{02}$— or —C≡C— in such a manner that O and/or S atoms are not linked directly to one another, preferably n-alkyl, n-alkoxy with 1 to 9C-atoms, preferably 2 to 5C-atoms, alkenyl, alkenyloxy or alkoxyalkyl with 2 to 9C-atoms, preferably with 2 to 5C-atoms or halogenated alkyl, halogenated alkenyl or halogenated alkoxy, preferably mono fluorinated, di-fluorinated or oligofluorinated alkyl, alkenyl or alkoxy, most preferably n-alkyl, n-alkoxy, alkenyl, alkenyloxy or alkoxyalkyl,
$Y^{01}$ and $Y^{02}$ are, independently of each other, F, Cl, or CN, and alternatively one of them may be H,
$R^{01}$ and $R^{02}$ are, independently of each other, H or alkyl with 1 to 12 C-atoms, and
$X^{51}$ denotes F or $CF_3$, or $R^{51}$ In a preferred embodiment of the present invention the liquid-crystalline component of the ER fluid comprises one more compounds of formula V, preferably selected from the group of compounds of its sub-formulae V-1 to V-8, V-1

V-2
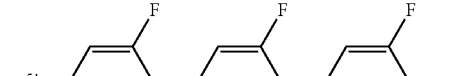

V-3
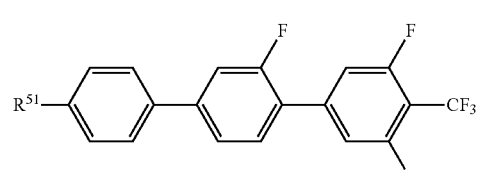

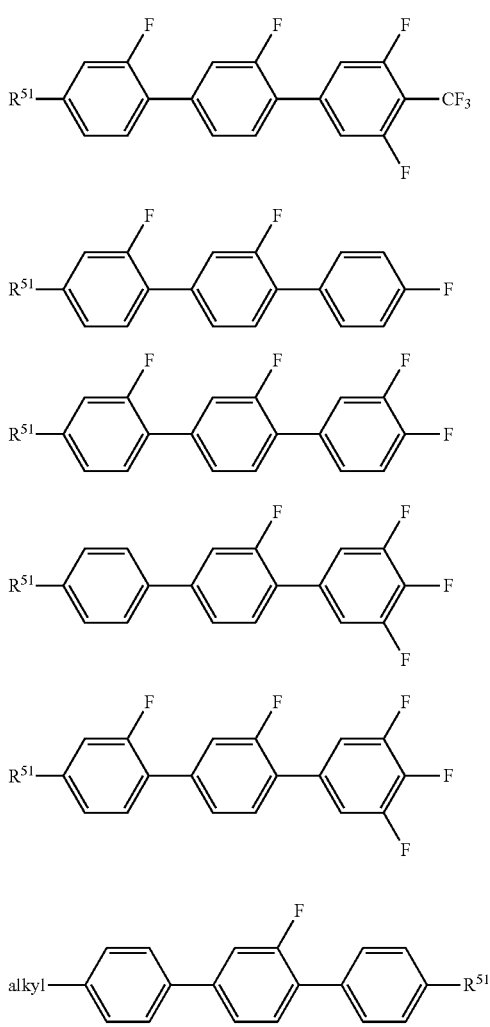

V-4
V-5
V-6
V-7
V-8
V-9 wherein $R^{51}$ has the meaning given under formula II above.

Preferably, the liquid-crystalline component of the ER fluid according to the present invention comprises one more compounds formula VI

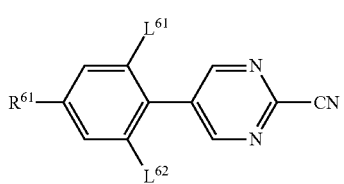

VI wherein
$R^{61}$ is alkyl, which is straight chain or branched, preferably has 1 to 20C-atoms, is unsubstituted, mono- or poly-substituted by F, Cl or CN, preferably by F, and in which one or more $CH_2$ groups are optionally replaced, in each case independently from one another, by —O—, —S—, —$NR^{01}$—, —$SiR^{01}R^{02}$—, —CO—, —COO—, —OCO—, —OCO—O—, —S—CO—, —CO—S—, —$CY^{01}$=$CY^{02}$— or —C≡C— in such a manner that O and/or S atoms are not linked directly to one another, preferably n-alkyl or n-alkoxy with 1 to 9C-atoms, preferably with 2 to 5C-atoms, alkenyl, alkenyloxy or alkoxyalkyl with 2 to 9C-atoms, preferably with 2 to 5C-atoms or halogenated alkyl, halogenated alkenyl or halogenated alkoxy with preferably up to 9C-atoms, preferably mono fluorinated, di-fluorinated or oligofluorinated alkyl, alkenyl or alkoxy with preferably up to 9C-atoms, most preferably n-alkyl, n-alkoxy, alkenyl, alkenyloxy or alkoxyalkyl with preferably up to 9C-atoms, $L^{61}$ and $L^{62}$ are, independently of each other, H or F, preferably one is F sand the other H or F and most preferably both are F, $Y^{01}$ and $Y^{02}$ are, independently of each other, F, Cl or CN, and alternatively one of them may be H, and $R^{01}$ and $R^{02}$ are, independently of each other, H or alkyl with 1 to 12 C-atoms.

Preferably, the compounds of formula VI are selected from the compounds of formula VI-1 and VI-2, preferably from formula VI-2

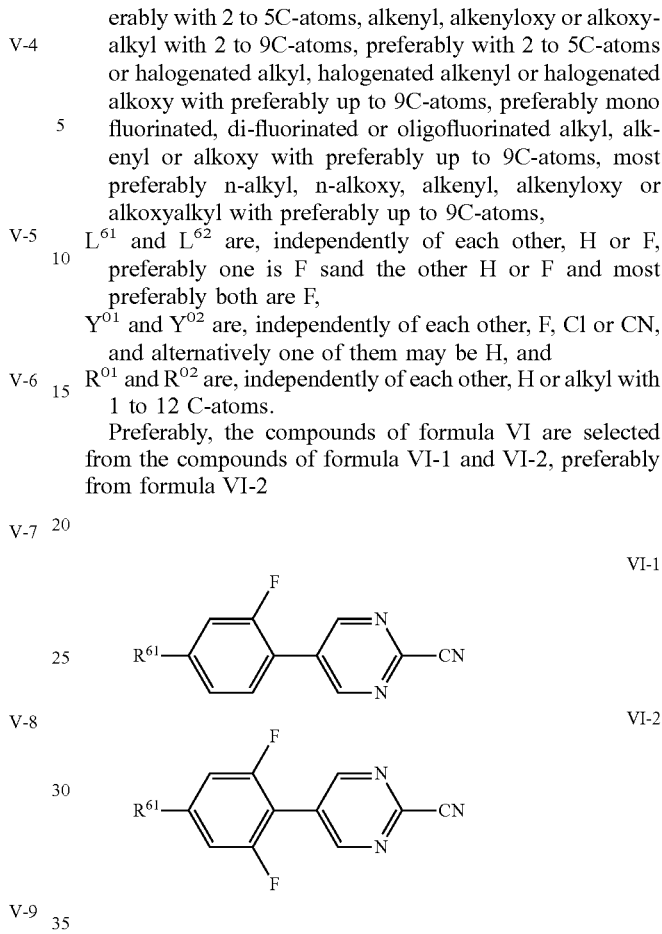

VI-1
VI-2 wherein $R^{61}$ has the meaning given under formula VI above.

An alkyl group or an alkoxy group, i.e. an alkyl group where the terminal $CH_2$ group is replaced by —O—, in this application may be straight chain or branched. It is preferably straight-chain, has 1, 2, 3, 4, 5, 6, 7 or 8 carbon atoms and accordingly is preferably methyl, ethyl, propyl, butyl, pentyl, hexyl, heptyl, octyl, ethoxy, propoxy, butoxy, pentoxy, hexoxy, heptoxy, or octoxy, furthermore nonyl, decyl, undecyl, dodecyl, tridecyl, tetradecyl, pentadecyl, nonoxy, decoxy, undecoxy, dodecoxy, tridecoxy or tetradecoxy, for example.

Oxaalkyl, i.e. an alkyl group in which one non-terminal $CH_2$ group is replaced by —O—, is preferably straight-chain 2-oxapropyl(=methoxy-methyl), 2-(=ethoxymethyl) or 3-oxabutyl(=2-methoxyethyl), 2-, 3-, or 4-oxapentyl, 2-, 3-, 4-, or 5-oxahexyl, 2-, 3-, 4-, 5-, or 6-oxaheptyl, 2-, 3-, 4-, 5-, 6- or 7-oxaoctyl, 2-, 3-, 4-, 5-, 6-, 7- or 8-oxanonyl or 2-, 3-, 4-, 5-, 6-, 7-, 8- or 9-oxadecyl, for example.

An alkenyl group, i.e. an alkyl group wherein one or more $CH_2$ groups are replaced by —CH=CH—, may be straight chain or branched. It is preferably straight-chain, has 2 to 10C atoms and accordingly is preferably vinyl, prop-1-, or prop-2-enyl, but-1-, 2- or but-3-enyl, pent-1-, 2-, 3- or pent-4-enyl, hex-1-, 2-, 3-, 4- or hex-5-enyl, hept-1-, 2-, 3-, 4-, 5- or hept-6-enyl, oct-1-, 2-, 3-, 4-, 5-, 6- or oct-7-enyl, non-1-, 2-, 3-, 4-, 5-, 6-, 7- or non-8-enyl, dec-1-, 2-, 3-, 4-, 5-, 6-, 7-, 8- or dec-9-enyl.

Especially preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-$C_7$-6-alkenyl, in particular $C_2$-$C_7$-1E-alkenyl, $C_4$-$C_7$-3E-alkenyl and $C_5$-$C_7$-4-alkenyl. Examples for particularly preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5C-atoms are generally preferred.

In an alkyl group, wherein one $CH_2$ group is replaced by —O— and one by —CO—, these radicals are preferably neighboured. Accordingly, these radicals together form a carbonyloxy group —CO—O— or an oxycarbonyl group —O—CO—. Preferably, such an alkyl group is straight chain and has 2 to 6C atoms.

It is accordingly preferably acetyloxy, propionyloxy, butyryloxy, pentanoyloxy, hexanoyloxy, acetyloxymethyl, propionyloxymethyl, butyryloxymethyl, pentanoyloxymethyl, 2-acetyloxyethyl, 2-propionyloxy-ethyl, 2-butyryloxyethyl, 3-acetyloxypropyl, 3-propionyloxypropyl, 4-acetyloxybutyl, methoxycarbonyl, ethoxycarbonyl, propoxycarbonyl, butoxycarbonyl, pentoxycarbonyl, methoxycarbonylmethyl, ethoxy-carbonylmethyl, propoxycarbonylmethyl, butoxycarbonylmethyl, 2-(methoxycarbonyl)ethyl, 2-(ethoxycarbonyl)ethyl, 2-(propoxy-carbonyl) ethyl, 3-(methoxycarbonyl)propyl, 3-(ethoxycarbonyl) propyl, 4-(methoxycarbonyl)-butyl.

An alkyl group wherein two or more $CH_2$ groups are replaced by —O— and/or —COO—, it can be straight chain or branched. It is preferably straight chain and has 3 to 12C atoms. Accordingly it is preferably bis-carboxy-methyl, 2,2-bis-carboxy-ethyl, 3,3-bis-carboxy-propyl, 4,4-bis-carboxy-butyl, 5,5-bis-carboxy-pentyl, 6,6-bis-carboxy-hexyl, 7,7-bis-carboxy-heptyl, 8,8-bis-carboxy-octyl, 9,9-bis-carboxy-nonyl, 10,10-bis-carboxy-decyl, bis-(methoxycarbonyl)-methyl, 2,2-bis-(methoxycarbonyl)-ethyl, 3,3-bis-(methoxycarbonyl)-propyl, 4,4-bis-(methoxycarbonyl)-butyl, 5,5-bis-(methoxycarbonyl)-pentyl, 6,6-bis-(methoxycarbonyl)-hexyl, 7,7-bis-(methoxycarbonyl)-heptyl, 8,8-bis-(methoxycarbonyl)-octyl, bis-(ethoxycarbonyl)-methyl, 2,2-bis-(ethoxycarbonyl)-ethyl, 3,3-bis-(ethoxycarbonyl)-propyl, 4,4-bis-(ethoxycarbonyl)-butyl, 5,5-bis-(ethoxycarbonyl)-hexyl.

An alkyl or alkenyl group that is monosubstituted by CN or $CF_3$ is preferably straight chain. The substitution by CN or $CF_3$ can be in any desired position.

An alkyl or alkenyl group that is at least monosubstituted by halogen, it is preferably straight chain. Halogen is preferably F or Cl, in case of multiple substitutions preferably F. The resulting groups include also perfluorinated groups. In case of monosubstitution, the F or Cl substituent can be in any desired position, but is preferably in ω-position. Examples for especially preferred straight-chain groups with a terminal F substituent are fluoromethyl, 2-fluoroethyl, 3-fluoropropyl, 4-fluorobutyl, 5-fluoropentyl, 6-fluorohexyl, and 7-fluoroheptyl. Other positions of F are not excluded.

Halogen means F, Cl, Br and I and is preferably F or Cl, most preferably F.

Each of R may be a polar or a non-polar group. In case of a polar group, it is preferably selected from CN, $SF_5$, halogen, $OCH_3$, SCN, $COR^5$, $COOR^5$ or a mono-oligo- or polyfluorinated alkyl or alkoxy group with 1 to 4C atoms. $R^5$ is optionally fluorinated alkyl with 1 to 4, preferably 1 to 3C atoms. Especially preferred polar groups are selected of F, Cl, CN, $OCH_3$, $COCH_3$, $COC_2H_5$, $COOCH_3$, $COOC_2H_5$, $CF_3$, $CHF_2$, $CH_2F$, $OCF_3$, $OCHF_2$, $OCH_2F$, $C_2F_5$ and $OC_2F_5$, in particular F, Cl, CN, $CF_3$, $OCHF_2$ and $OCF_3$. In case of a non-polar group, it is preferably alkyl with up to 15C atoms or alkoxy with 2 to 15C atoms.

In addition, compounds containing an achiral-branched alkyl group may occasionally be of importance, for example, due to a reduction in the tendency towards crystallization. Branched groups of this type generally do not contain more than one chain branch. Preferred achiral branched groups are isopropyl, isobutyl(=methylpropyl), isopentyl(=3-methylbutyl), isopropoxy, 2-methyl-propoxy and 3-methylbutoxy.

All herein mentioned compounds are accessible by the usual methods known to the expert. Starting materials are either commercially available or accessible by published methods such as, for example, in Houben-Weyl, Methoden der organischen Chemie [Methods of Organic Chemistry], Thieme-Verlag, Stuttgart.

Comprising in this application means in the context of compositions that the entity referred to, e.g. the medium or the component, contains the compound or compounds in question, preferably in a total concentration of 10% or more and most preferably of 20% or more.

Predominantly consisting, in this context, means that the entity referred to contains 80% or more, preferably 90% or more and most preferably 95% or more of the compound or compounds in question.

Entirely consisting, in this context, means that the entity referred to contains 98% or more, preferably 99% or more and most preferably 100.0% of the compound or compounds in question.

The concentration of the compounds of formula I and/or I*, preferably selected from the compounds of formulae I-1 and/or I-2 and/or I*-2 and/or I*-5 and/or I*-6 and/or I*-8 are contained in the liquid-crystalline component of the ER fluid according to the present application preferably is in the range from 0.5% or more to 90% or less, more preferably in the range from 1% or more to 80% or less and most preferably in the range from 10% or more to 75% or less.

In a preferred embodiment the liquid-crystalline component of the ER fluid according to the instant invention, comprise one compound or more compounds selected from the group of compounds of formula II, preferably in a total concentration of 1% to 40% by weight, more preferably in a concentration of 1% to 35% by weight, and most preferably in a concentration of case of 1% to 10% by weight for each single compound present, or one compound or more compounds of formula III-1, preferably in a total concentration of 1% to 40% by weight, more preferably in a concentration of 1% to 30% by weight, and most preferably in a concentration of case of 1% to 20% by weight for each single compound present, and/or one compound or more compounds of formula III-2, preferably in a total concentration of 1% to 25% by weight, more preferably in a concentration of 1% to 10% by weight, and most preferably in a concentration of case of 1% to 15% by weight for each single compound present.

one compound or more compounds selected from the group of compounds of formula IV, preferably in a concentration of 1% to 25% by weight, and/or optionally, preferably obligatorily, one or more compounds selected from the group of compounds of formulae V preferably in a concentration of 1% to 25% by weight, and/or optionally, preferably obligatorily, one or more compounds selected from the group of compounds of formula VI preferably in a concentration of 1% to 25% by weight.

In another embodiment of the present invention, the liquid-crystalline component of the ER fluid according to the instant invention, comprise Suitable the liquid-crystalline components of the ER fluid preferably comprises one or more compounds selected from the group of compounds of formulae I and/or I* and II and optionally III, preferably in a total concentration in the range from 5% or more to 99% or less, preferably from 10% or more to 95% or less and most preferably from 12% or more to 90% or less.

In particular, the liquid-crystalline component of the ER fluid preferably comprises one or more compounds of formula I and or I* in a total concentration in the range from 40% or more to 80% or less, preferably from 45% or more to 75% or less and most preferably from 50% or more to 70% or less.

In case the liquid-crystalline component of the ER fluid comprises one or more compounds formula II, the total concentration of these compounds preferably is in the range from 1% or more to 35% or less, preferably from 2% or more to 20% or less and most preferably from 4% or more to 17% or less.

In case the liquid-crystalline component of the ER fluid comprises one or more compounds formula III, the total concentration of these compounds preferably is in the range from 1% or more to 75% or less, preferably from 2% or more to 50% or less and most preferably from 3% or more to 30% or less.

In case the liquid-crystalline component of the ER fluid comprises one or more compounds formula IV the total concentration of these compounds preferably is in the range from 1% or more to 20% or less, preferably from 2% or more to 15% or less and, most preferably, from 5% or more to 10% or less.

In case the liquid-crystalline component of the ER fluid comprises one or more compounds formula V the total concentration of these compounds preferably is in the range from 3% or more to 45% or less, preferably from 5% or more to 40% or less and most preferably from 7% or more to 35% or less.

In case the liquid-crystalline component of the ER fluid comprises one or more compounds formula VII the total concentration of these compounds preferably is in the range from 1% or more to 15% or less, preferably from 3% or more to 12% or less and most preferably from 5% or more to 10% or less.

Preferred embodiments are indicated below:

The medium comprises one, two, three, four or more compounds of formula I and/or 1*, preferably selected from the group of compounds of formulae I-1, I-2, and/or I*-2, I*-5, I*-6, I*-8 the medium comprises one, two or more compounds of formula II, preferably of formulae II-3 and II-4, more preferably of formulae II-3a, II-3c and II-4d, and/or the medium comprises one or more compounds of formula III preferably of formulae III-1 and III-2, more preferably of formulae III-1b and III-2a and/or the medium comprises one, two or more compounds of formula IV, and/or the medium comprises optionally one, two, three or more compounds of formula V, and/or the medium comprises optionally one, two, three or more compounds of formula VI, preferably of formula VI-2 and/or Preference is given, in particular, to a liquid-crystalline component of the ER fluid, which, besides one or more compounds of the formula I and/or I*, comprise one or more compounds of the formula III.

The compounds of the formulae I to VI are colourless, stable, and readily miscible with one another and with other liquid-crystalline materials.

The optimum mixing ratio of the compounds of the formulae I and/or I* and II and III depends substantially on the desired properties, on the choice of the components of the formulae I and/or I*, II and/or III, and on the choice of any other components that may be present. Suitable mixing ratios within the range given above can easily be determined from case to case.

The total amount of compounds of the formulae I and II and optionally III in the liquid-crystalline component of the ER fluid in accordance with the present invention is in many cases not crucial. The mixtures can therefore comprise one or more further components for the purposes of optimisation of various properties. However, the observed effect on the operating voltage and the operating temperature range is generally greater, the higher the total concentration of compounds of the formulae I and II and optionally III.

In a particularly preferred embodiment, the liquid-crystalline component of the ER fluid in accordance with the present invention comprises one or more compounds each of the formulae I and II and optionally III. A favourable synergistic effect with the compounds of the formula I results in particularly advantageous properties.

The individual compounds of the formulae I, I*, II to VI, which can be used in the liquid-crystalline component of the ER fluid according to the invention, either are known or can be prepared analogously to the known compounds.

Other mesogenic compounds, which are not explicitly mentioned above, can optionally and advantageously also be used in an amount ≥60%, preferably ≥55%, even more preferably ≥55%, in the media in accordance with the present invention. Such compounds are known to the person skilled in the art and are, for example, selected from the group of compounds characterized by the formulae A, B, C, D, E, and F:

| | |
|---|---|
| R'-L-E-R" | (A) |
| R'-L-CF$_2$O-E-R" | (B) |
| R'-L-COO-E-R" | (C) |
| R'-L-CH$_2$CH$_2$-E-R" | (D) |
| R'-L-CH=CH-E-R" | (E) |
| R'-L-C≡C-E-R" | (F) | wherein

L, E are each independently selected from the group consisting of -Phe-, -Cyc-, -Phe-Phe-, -Cyc-Phe-, -Cyc-Cyc-, -Dio-, -G-Phe-, and -G-Cyc-; as well as the mirror images of the groups mentioned before, wherein Phe is unsubstitued 1,4-phenylene, Cyc is trans-1,4-cyclohexylene or 1,4-cyclohexenylene, Dio is 1,3-dioxane-2,5-diyl, and G is 2-(trans-1,4-cyclohexyl)-ethyl, pyrimidine-2,5-diyl, pyridine-2,5-diyl, or 1,3-dioxane-2,5-diyl;

preferably at least one of the groups L and E is Cyc, Phe; more preferably E is Cyc, Phe or Phe-Cyc.

In a preferred embodiment of the present invention the liquid crystal compositions of the present invention contain one or more components selected from the group consisting of formulae A, B, C, D, E, and F, wherein L and E are selected from the group consisting of Cyc, Phe, and at the same time one or more components selected from compounds of formulae A, B, C, D, and E, wherein one of the groups L and E is selected from the group consisting of Cyc, Phe, and the other group is selected from the group consisting of -Phe-Phe, -Cyc-Phe-, -Cyc-Cyc-, -G-Phe-, and -G-Cyc, and optionally one or more components selected from the group consisting of the compounds of formulae A, B, C, D, E, and F, wherein the groups L and E are selected from the group consisting of -Cyc-Phe-, -Cyc-Cyc-, -G-Phe-, and -G-Cyc.

R' and R" each are independently of each other alkyl, alkenyl, alkoxy, alkenyloxy or alkanoyloxy having from 1 to 8 carbon atoms, preferably R' and R" are different and at least one of R' and R" is alkyl or alkenyl.

In a further embodiment R' is alkyl, alkenyl, alkoxy, alkenyloxy, or alkanoyloxy having from 1 to 8 carbon atoms, preferably alkyl or alkenyl, and The compounds of the present invention are either commercially available or can be synthesized according to or in analogy to methods which are known per se and which are described in standard works of organic chemistry such as, for example, Houben-Weyl, Methoden der organischen Chemie, Thieme-Verlag, Stuttgart.

Throughout the description and claims of this specification, the words "comprise" and "contain" and variations of the words, for example "comprising" and "comprises", mean "including but not limited to", and are not intended to (and do not) exclude other components. On the other hand, the word "comprise" also encompasses the term "consisting of" but is not limited to it.

The liquid-crystal component of the ER fluid according to the present invention is prepared in a manner conventional per se. In general, the desired amount of the components used in lesser amount is dissolved in the components making up the principal constituent, preferably at elevated temperature. It is also possible to mix solutions of the components in an organic solvent, for example in acetone, chloroform or methanol, and to remove the solvent again, for example by distillation, after thorough mixing. It is furthermore possible to prepare the mixtures in other conventional manners, for example through the use of pre-mixes, for example homologue mixtures, or using so-called "multibottle" systems.

The electro-rheological fluid as described above and below is especially suitable for the use in a device according to the present invention as described above and below.

The functional principle of the device according to the invention will be explained in detail below. It is noted that no restriction of the scope of the claimed invention, which is not present in the claims, is to be derived from the comments on the assumed way of functioning.

In operation, the user is expected to touch the flexible cover substrate of the device. Hereby, a direct finger touch is preferred but indirect touch with a pencil or stylus is also possible. As the point of touch is moved across the device, activation of electrodes in certain areas leads to the spontaneous solidification of the ER fluids, or at least to the dramatically increase of its viscosity, in response to an electric field, due to the formation of particle chains that bridge the electrodes. Therefore, a detectable change in resistance to movement, apparent surface relief, or surface texture is provided. No other means for displacing the ER fluid is required.

It will be appreciated that variations to the foregoing embodiments of the invention can be made while still falling within the scope of the invention. Alternative features serving the same, equivalent, or similar purpose may replace each feature disclosed in this specification, unless stated otherwise. Thus, unless stated otherwise, each feature disclosed is one example only of a generic series of equivalent or similar features.

All of the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

It will be appreciated that many of the features described above, particularly of the preferred embodiments, are inventive in their own right and not just as part of an embodiment of the present invention. Independent protection may be sought for these features in addition to or alternative to any invention presently claimed.

The parameter ranges indicated in this application all include the limit values, unless expressly stated otherwise.

The different upper and lower limit values indicated for various ranges of properties in combination with one another give rise to additional preferred ranges.

Compounds containing a vinyl end group and compounds containing a methyl end group have low rotational viscosity.

In the present invention and especially in the following examples, the structures of the mesogenic compounds are indicated by means of abbreviations also referred to as acronyms. In these acronyms, the chemical formulae are abbreviated as follows using Tables A to C below. All groups $C_nH_{2n+1}$, $C_mH_{2m+1}$ and $C_lH_{2l+1}$ or $C_nH_{2n-1}$, $C_mH_{2m-1}$ and $C_lH_{2l-1}$ denote straight-chain alkyl or alkenyl, preferably 1-E-alkenyl, respectively, in each case having n, m or l C atoms. Table A lists the codes used for the ring elements of the core structures of the compounds, while Table B shows the linking groups. Table C gives the meanings of the codes for the left-hand or right-hand end groups. Table D shows illustrative structures of compounds with their respective abbreviations. Table E shows illustrative structures of stabilizers.

TABLE A

Ring elements

C, P, D, DI, A, AI, G, GI, U, UI

TABLE A-continued

Ring elements

| | | | | |
|---|---|---|---|---|
| Y | [structure: difluorobenzene] | | | |
| M | [structure: pyrimidine] | MI | [structure: pyrimidine] | |
| N | [structure: pyridine] | NI | [structure: pyridine] | |
| Np | [structure: naphthalene] | dH | [structure: decahydronaphthalene] | |
| N3f | [structure: trifluoronaphthalene] | N3fI | [structure: trifluoronaphthalene] | |
| tH | [structure: tetrahydronaphthalene] | tHI | [structure: tetrahydronaphthalene] | |
| tH2f | [structure: difluorotetrahydronaphthalene] | tH2fI | [structure: difluorotetrahydronaphthalene] | |
| K | [structure: fluorinated indane] | KI | [structure: fluorinated indane] | |
| L | [structure: cyclohexene] | LI | [structure: cyclohexene] | |
| F | [structure: fluorocyclohexene] | FI | [structure: fluorocyclohexene] | |

TABLE B

Linking groups

| | | | |
|---|---|---|---|
| E | —CH$_2$CH$_2$— | Z | —CO—O— |
| V | —CH=CH— | ZI | —O—CO— |
| X | —CF=CH— | O | —CH$_2$—O— |
| XI | —CH=CF— | OI | —O—CH$_2$— |
| B | —CF=CF— | Q | —CF$_2$—O— |
| T | —C≡C— | QI | —O—CF$_2$— |
| W | —CF$_2$CF$_2$— | T | —C≡C— |

TABLE C

End groups

| Left-hand side | | Right-hand side | |
|---|---|---|---|
| Use alone | | | |
| -n- | C$_n$H$_{2n+1}$— | -n | —C$_n$H$_{2n+1}$ |
| -nO— | C$_n$H$_{2n+1}$—O— | -nO | —O—C$_n$H$_{2n+1}$ |
| —V— | CH$_2$=CH— | —V | —CH=CH$_2$ |
| -nV— | C$_n$H$_{2n+1}$—CH=CH— | -nV | —C$_n$H$_{2n}$—CH=CH$_2$ |
| —Vn- | CH$_2$=CH—C$_n$H$_{2n+1}$— | —Vn | —CH=CH—C$_n$H$_{2n+1}$ |
| -nVm- | C$_n$H$_{2n+1}$—CH=CH—C$_m$H$_{2m}$— | -nVm | —C$_n$H$_{2n}$—CH=CH—C$_m$H$_{2m+1}$ |
| —N— | N≡C— | —N | —C≡N |
| —S— | S=C=N— | —S | —N=C=S |
| —F— | F— | —F | —F |
| —CL— | Cl— | —CL | —Cl |
| —M— | CFH$_2$— | —M | —CFH$_2$ |
| —D— | CF$_2$H— | —D | —CF$_2$H |
| —T— | CF$_3$— | —T | —CF$_3$ |
| —MO— | CFH$_2$O— | —OM | —OCFH$_2$ |
| —DO— | CF$_2$HO— | —OD | —OCF$_2$H |
| —TO— | CF$_3$O— | —OT | —OCF$_3$ |
| —OXF— | CF$_2$=CH—O— | —OXF | —O—CH=CF$_2$ |
| —A— | H—C≡C— | —A | —C≡C—H |
| -nA— | CnH$_{2n+1}$—C≡C— | —An | —C≡C—C$_n$H$_{2n+1}$ |
| —NA— | N≡C—C≡C— | —AN | —C≡C—C≡N |
| Use together with one another and/or with others | | | |
| -...A...- | —C≡C— | -...A...- | —C≡C— |
| -...V...- | —CH=CH— | -...V...- | —CH=CH— |
| -...Z...- | —CO—O— | -...Z...- | —CO—O— |
| -...ZI...- | —O—CO— | -...ZI... | —O—CO— |

TABLE C-continued

| End groups | |
|---|---|
| Left-hand side | Right-hand side |
| - ... K ... -   —CO— | - ... K ... —CO— |
| - ... W ... -   —CF=CF— | - ... W .. —CF=CF— | in which n and m each denote integers, and the three dots " ... " are place-holders for other abbreviations from this table.

The following table shows illustrative structures together with their respective abbreviations. These are shown in order to illustrate the meaning of the rules for the abbreviations. They furthermore represent compounds, which are preferably used.

TABLE D

Illustrative structures

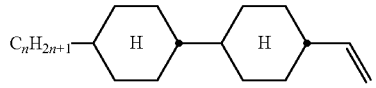

CC-n-V

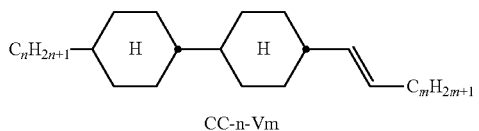

CC-n-Vm

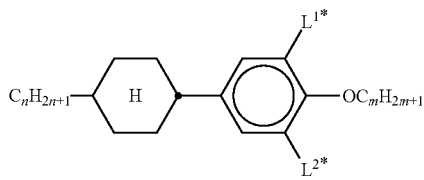

PCH-n0m

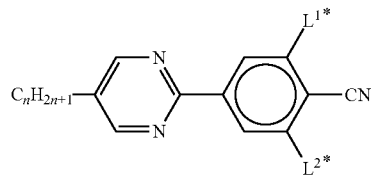

PYP-n

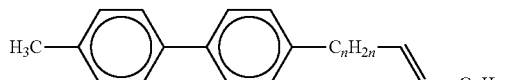

PP-1-nVm

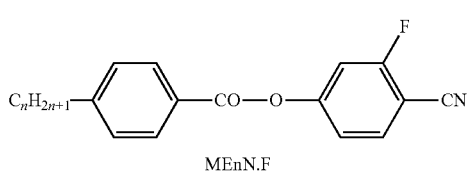

MEnN.F

TABLE D-continued
Illustrative structures
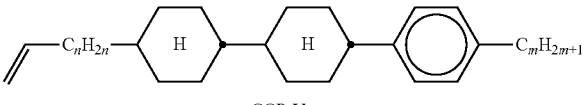
CCP-Vn-m
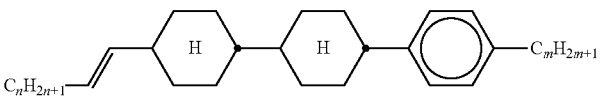
CCP-nV-m
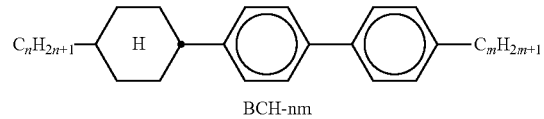
BCH-nm
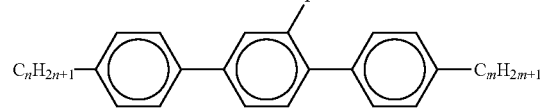
PGP-n-m
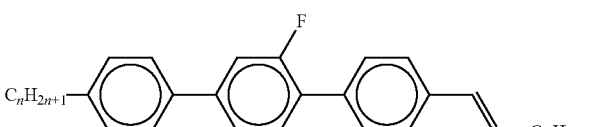
PGP-n-mV
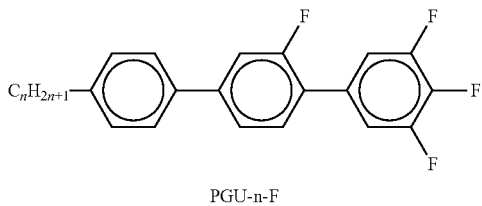
PGU-n-F
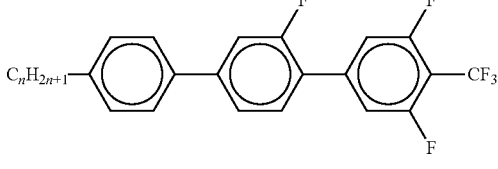
PGU-n-T
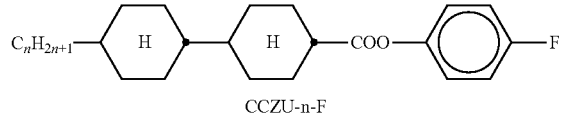
CCZU-n-F
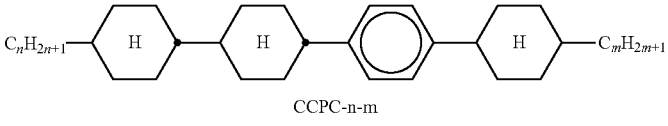
CCPC-n-m TABLE D-continued Illustrative structures CCGU-n-F CPGU-n-OT DPGU-n-F PPGU-n-F CPZG-n-N CCQU-n-F PUQU-n-F TABLE D-continued
Illustrative structures
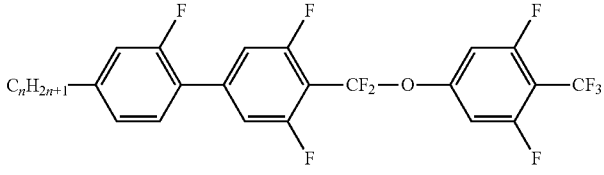
GUQU-n-F
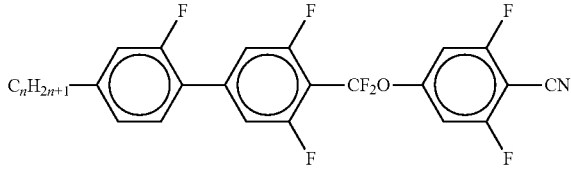
GUQU-n-N
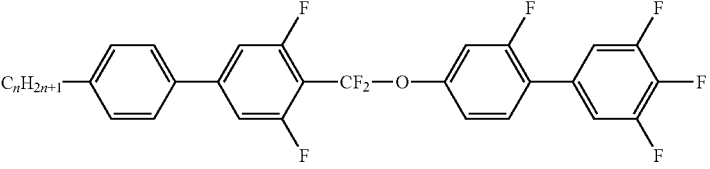
PUQGU-n-F
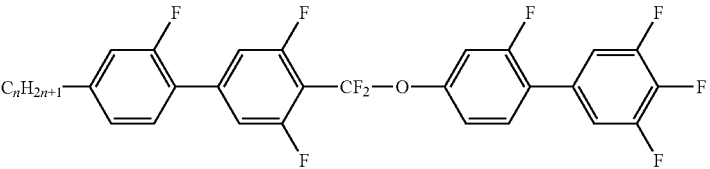
GUQGU-n-F
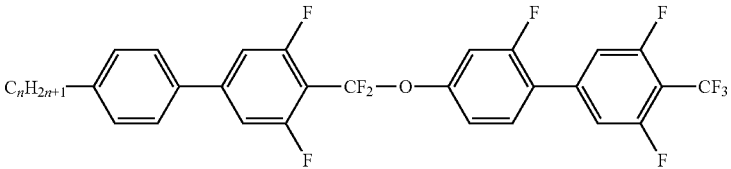
PUQGU-n-T
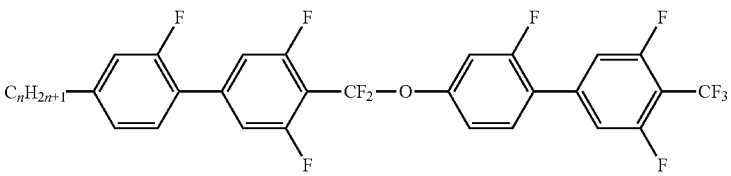
GUQGU-n-T
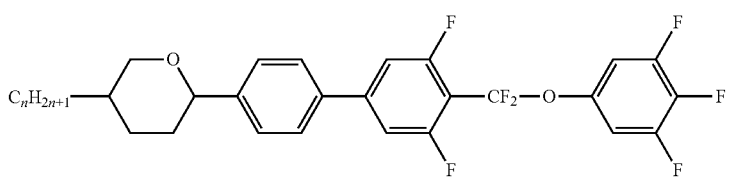
APUQU-n-F TABLE D-continued
Illustrative structures
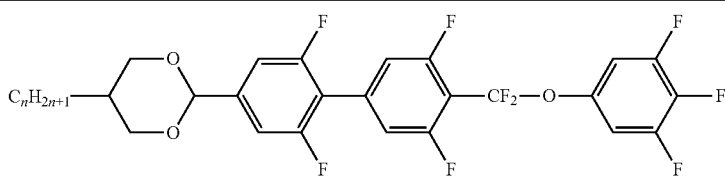
DUUQU-n-F
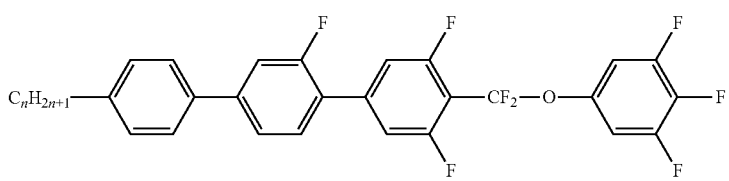
PGUQU-n-F
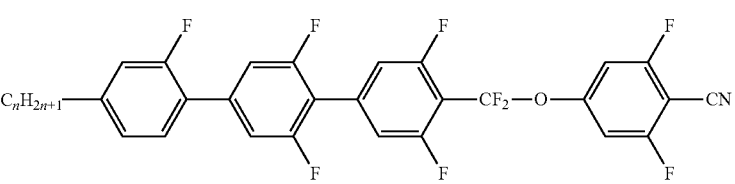
GUUQU-n-N
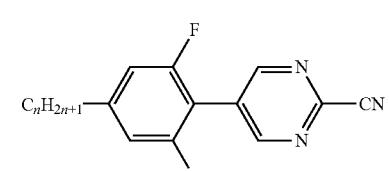
UM-n-N
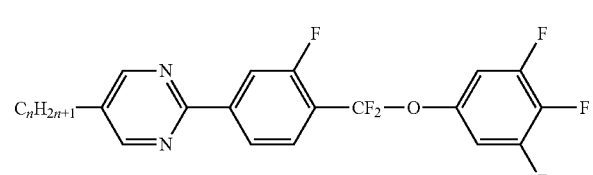
MGQU-n-F
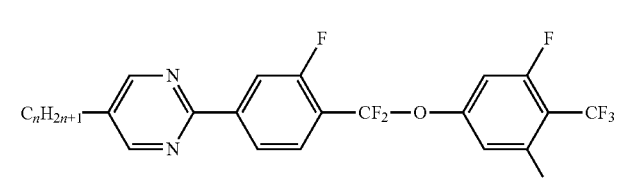
MGQU-n-T
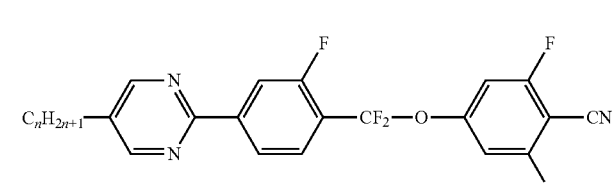
MGQU-n-N TABLE D-continued
Illustrative structures
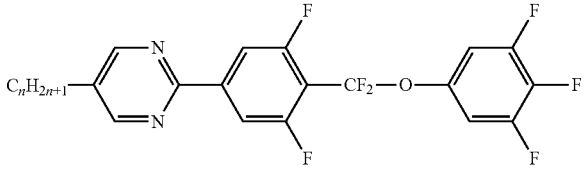
MUQU-n-F
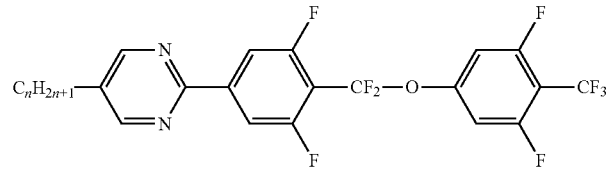
MUQU-n-T
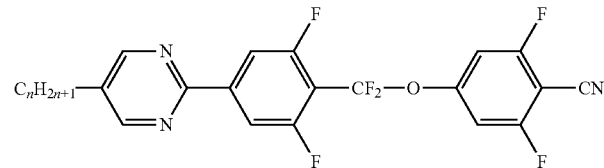
MUQU-n-N
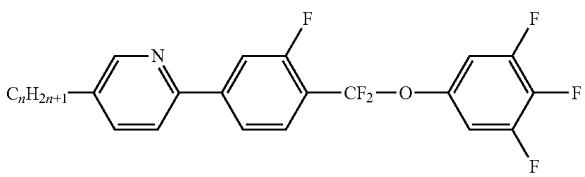
NGQU-n-F
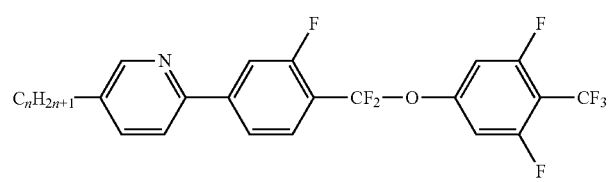
NGQU-n-T
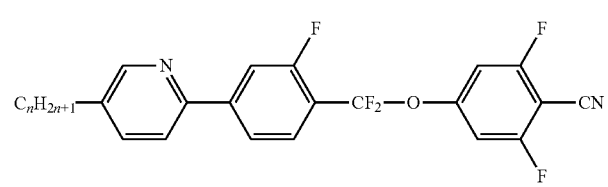
NGQU-n-N
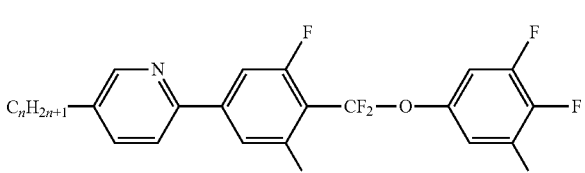
NUQU-n-F TABLE D-continued
Illustrative structures
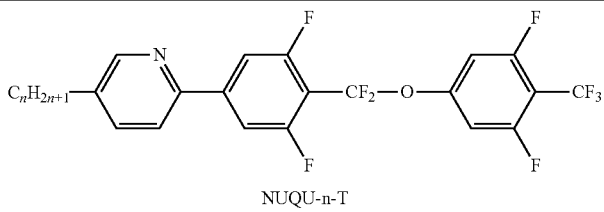
NUQU-n-T
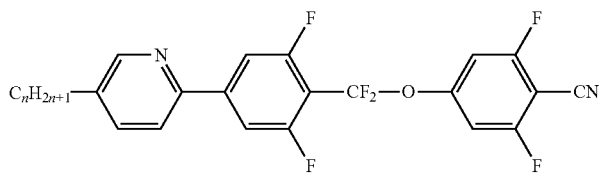
NUQU-n-N
in which n (m and l) preferably, independently of one another, denote(s) an integer from 1 to 7, preferably from 2 to 6.
The following table, Table E, shows illustrative compounds that can be used as stabiliser in the mesogenic media according to the present invention.
TABLE E
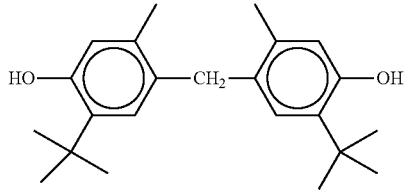
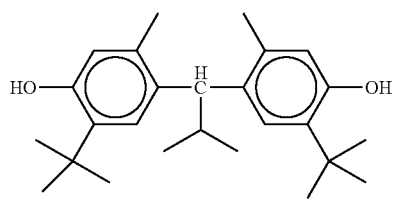
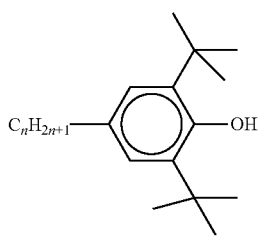
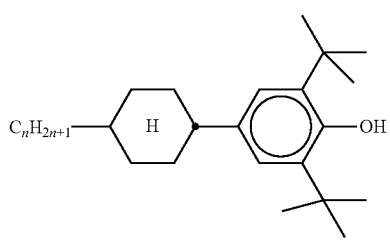
TABLE E-continued
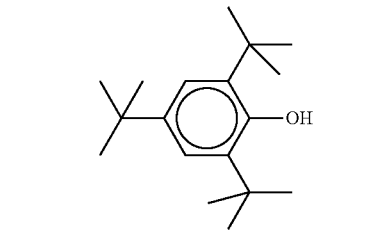
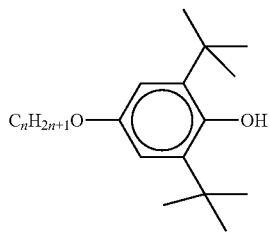
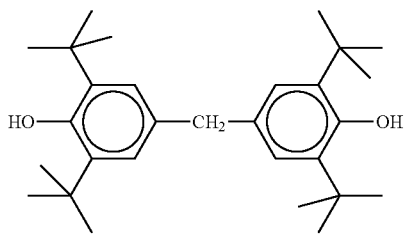
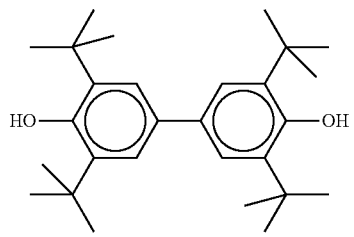

TABLE E-continued
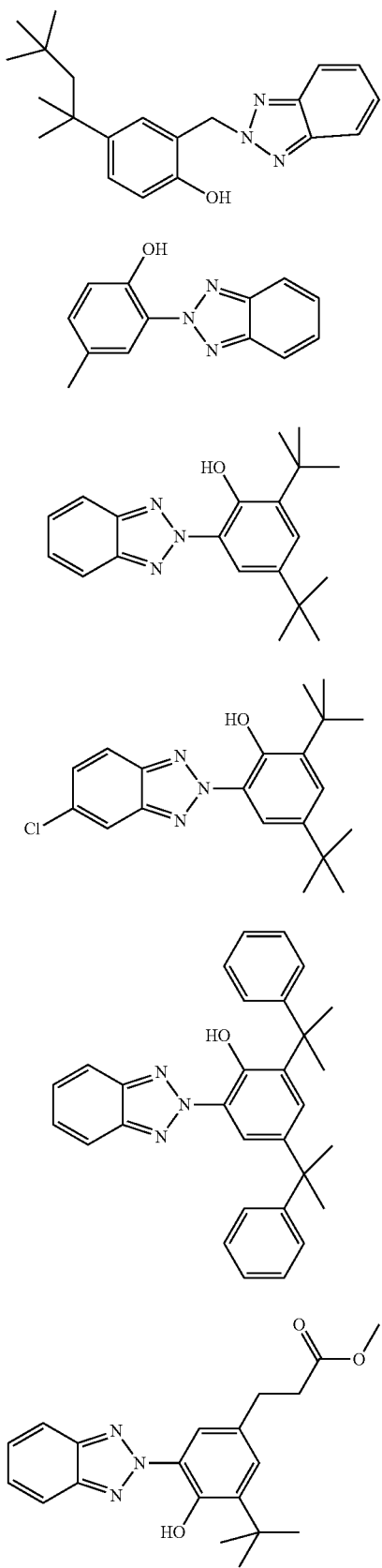
TABLE E-continued
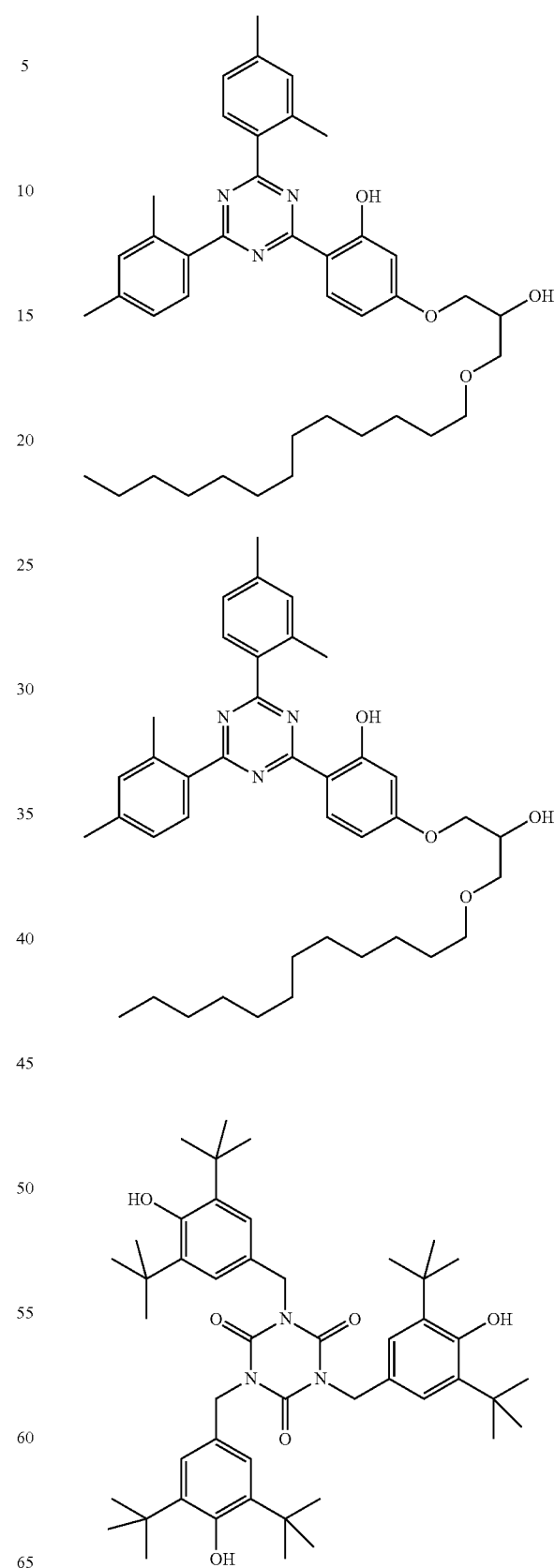

TABLE E-continued
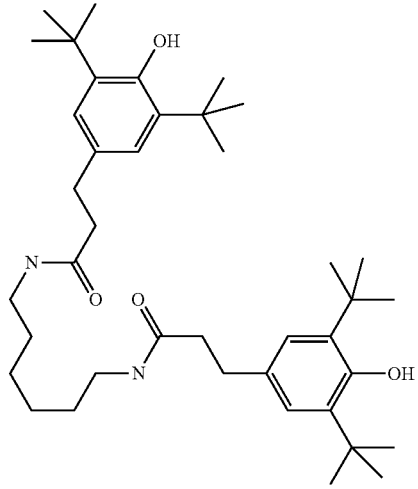 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
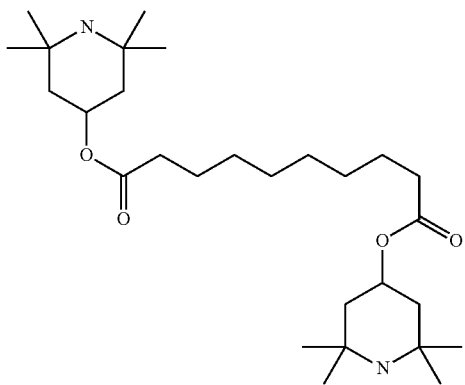
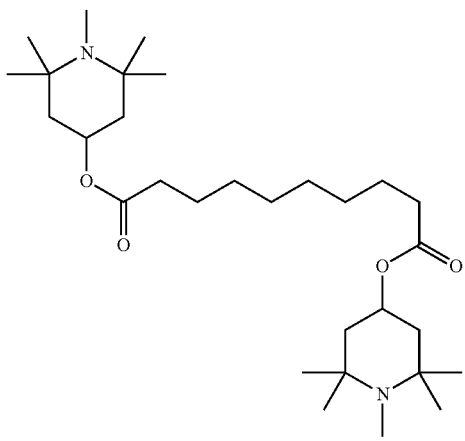
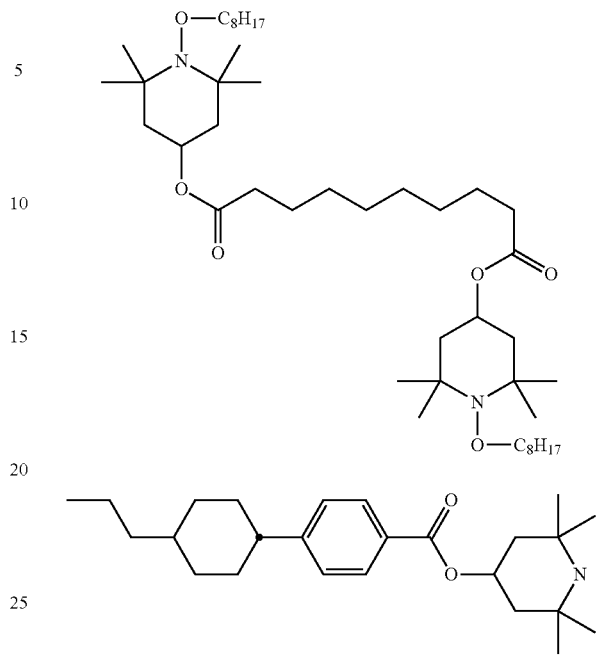
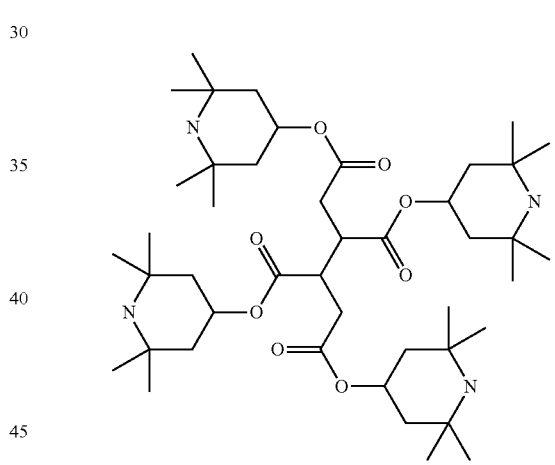
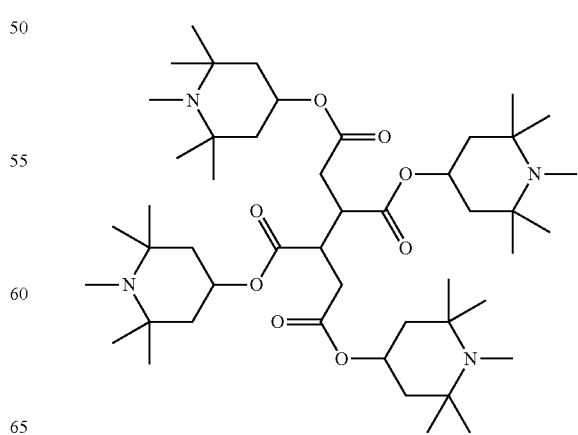

TABLE E-continued

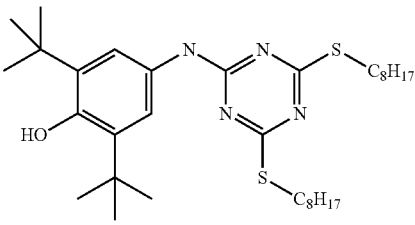

In a preferred embodiment of the present invention, the liquid-crystalline component of the ER fluid comprises one or more compounds selected from the group of the compounds from Table E.

The media according to the present application preferably comprise two or more, preferably four or more, compounds selected from the group consisting of the compounds from the above tables.

Examples

The invention will now be described in more detail by reference to the following working examples, which are illustrative only and do not limit the scope of the invention.

Mixture Examples

The following mixtures are prepared.

Composition and properties liquid crystal mixture M-1

| Compound No. | Abbreviation | Conc./mass-% | Physical Properties | | |
|---|---|---|---|---|---|
| 1 | PGU-3-F | 4.0 | T(N,I) | = | 80° C. |
| 2 | PUQU-3-F | 10.0 | $n_o$(20° C., 589 nm) | = | 1.4898 |
| 3 | CCQU-3-F | 8.0 | $n_e$(20° C., 589 nm) | = | 1.6218 |
| 4 | CPGU-3-OT | 4.0 | $\Delta n$(20° C., 589 nm) | = | 0.1320 |
| 5 | APUQU-2-F | 6.0 | $\varepsilon_\perp$(20°, 1 kHz) | = | 3.7 |
| 6 | APUQU-3-F | 4.0 | $\Delta\varepsilon$ (20°, 1 kHz) | = | 11.5 |
| 7 | CCGU-3-F | 8.0 | | | |
| 8 | PGUQU-3-F | 4.0 | | | |
| 9 | PCH-301 | 8.0 | | | |
| 10 | CC-3-V | 19.0 | | | |
| 11 | CC-3-V | 4.0 | | | |
| 12 | CC-%-V | 4.0 | | | |
| 13 | PP-1-2V1 | 4.0 | | | |
| 14 | CCP-V-1 | 2.0 | | | |
| 15 | PGP-2-3 | 2.0 | | | |
| 16 | PGP-2-2V | 9.0 | | | |
| Σ | | 100.0 | | | |

Composition and properties liquid crystal mixture M-2

| Compound No. | Abbreviation | Conc./mass-% | Physical Properties | | |
|---|---|---|---|---|---|
| 1 | ME2N.F | 14.0 | T(N,I) | = | 70° C. |
| 2 | ME3N.F | 14.0 | $n_o$(20° C., 589 nm) | = | 1.5028 |
| 3 | ME4N.F | 13.0 | $n_e$(20° C., 589 nm) | = | 1.6565 |
| 4 | ME5N.F | 13.0 | $\Delta n$(20° C., 589 nm) | = | 0.1537 |
| 5 | PYP-4 | 11.0 | $\varepsilon_\perp$(20°, 1 kHz) | = | 55.0 |
| 6 | CPZG-3-N | 4.0 | $\Delta\varepsilon$ (20°, 1 kHz) | = | 11.8 |
| 7 | CPZG-4-N | 4.0 | | | |
| 8 | CCZU-2-F | 8.0 | | | |
| 9 | CCZU-3-F | 11.0 | | | |
| 10 | CCPC-3-3 | 4.0 | | | |
| 11 | CCPC-3-3 | 4.0 | | | |
| Σ | | 100.0 | | | |

Composition and properties liquid crystal mixture M-3

| Compound No. | Abbreviation | Conc./mass-% | Physical Properties | | |
|---|---|---|---|---|---|
| 1 | GUQGU-3-F | 8.0 | T(N,I) | = | 72.5° C. |
| 2 | GUQGU-4-F | 6.0 | $n_o$(20° C., 589 nm) | = | 1.4882 |
| 3 | GUQGU-5-F | 4.0 | $n_e$(20° C., 589 nm) | = | 1.6811 |
| 4 | GUUGU-3-N | 6.0 | $\Delta n$(20° C., 589 nm) | = | 0.1929 |
| 5 | GUQU-3-F | 7.0 | $\varepsilon_\perp$(20°, 1 kHz) | = | 11.5 |
| 6 | GUQU-4-F | 6.0 | $\Delta\varepsilon$ (20°, 1 kHz) | = | 202.1 |
| 7 | GUQGU-2-T | 12.0 | | | |
| 8 | GUQGU-3-T | 12.0 | | | |
| 9 | GUQGU-4-T | 12.0 | | | |
| 10 | GUQGU-5-T | 12.0 | | | |
| 11 | DPGU-4-F | 8.0 | | | |
| 12 | PGU-5-T | 3.0 | | | |
| 13 | PGU-4-T | 4.0 | | | |
| Σ | | 100.0 | | | |

Composition and properties liquid crystal mixture M-4

| Compound No. | Abbreviation | Conc./mass-% | Physical Properties | | |
|---|---|---|---|---|---|
| 1 | GUQU-3-N | 8.0 | T(N,I) | = | 70° C. |
| 2 | GUQU-4-N | 8.0 | $n_o$(20° C., 589 nm) | = | 1.4937 |
| 3 | GUUQU-3-N | 10.0 | $n_e$(20° C., 589 nm) | = | 1.6838 |
| 4 | ME2N.F | 10.0 | $\Delta n$(20° C., 589 nm) | = | 0.1901 |
| 5 | ME3N.F | 10.0 | $\varepsilon_\perp$(20°, 1 kHz) | = | 152.8 |
| 6 | PUQGU-3-T | 7.0 | $\Delta\varepsilon$ (20°, 1 kHz) | = | 236.3 |
| 7 | PUQGU-4-T | 8.0 | | | |
| 8 | PUQGU-5-T | 7.0 | | | |
| 9 | DUUQU-3-F | 7.0 | | | |
| 10 | DUUQU-4-F | 8.0 | | | |
| 11 | DUUQU-5-F | 8.0 | | | |
| 12 | DPGU-4-F | 5.0 | | | |
| 13 | PPGU-3-F | 4.0 | | | |
| Σ | | 100.00 | | | |

Composition and properties liquid crystal mixture M-5

| Compound No. | Abbreviation | Conc./mass-% | Physical Properties | | |
|---|---|---|---|---|---|
| 1 | DPGU-4-F | 8.00 | T(N,I) | = | 76° C. |
| 2 | DUUQU-3-F | 3.00 | $n_o$(20° C., 589 nm) | = | — |
| 3 | DUUQU-4-F | 10.00 | $n_e$(20° C., 589 nm) | = | — |
| 4 | DUUQU-5-F | 7.00 | $\Delta n$(20° C., 589 nm) | = | — |
| 5 | GUQGU-2-T | 7.00 | $\varepsilon_\perp$(20°, 1 kHz) | = | — |
| 6 | GUQGU-3-T | 8.00 | $\Delta\varepsilon$ (20°, 1 kHz) | = | — |
| 7 | GUQU-2-N | 13.00 | | | |
| 8 | GUQU-3-N | 12.00 | | | |

-continued

Composition and properties liquid crystal mixture M-5

Composition

| Compound No. | Abbreviation | Conc./ mass-% | Physical Properties |
|---|---|---|---|
| 9 | GUUQU-3-N | 10.00 | |
| 10 | GUUQU-4-N | 10.00 | |
| 11 | ME2N.F | 12.00 | |
| Σ | | 100.00 | |

Composition and properties liquid crystal mixture M-6

Composition

| Compound No. | Abbreviation | Conc./ mass-% | Physical Properties | | | |
|---|---|---|---|---|---|---|
| 1 | PGU-3-F | 4.0 | T(N,I) | = | 80° C. | |
| 2 | PUQU-3-F | 10.0 | $n_o$(20° C., 589 nm) | = | 1.4945 | |
| 3 | CPGU-3-OT | 4.0 | $n_e$(20° C., 589 nm) | = | 1.6265 | |
| 4 | APUQU-2-F | 4.0 | Δn(20° C., 589 nm) | = | 0.1320 | |
| 5 | APUQU-3-F | 4.0 | $\varepsilon_\perp$(20°, 1 kHz) | = | 3.5 | |
| 6 | CCGU-3-F | 4.0 | Δε (20°, 1 kHz) | = | 8.3 | |
| 7 | PGUQU-3-F | 4.0 | | | | |
| 8 | PCH-301 | 12.0 | | | | |
| 9 | CC-3-V | 20.0 | | | | |
| 10 | CC-3-V1 | 4.0 | | | | |
| 11 | CC-5-V | 4.0 | | | | |
| 12 | PP-1-2V1 | 2.0 | | | | |
| 13 | CCP-V-1 | 4.0 | | | | |
| 14 | CCP-V2-1 | 4.0 | | | | |
| 15 | PGP-2-3 | 2.0 | | | | |
| 16 | PGP-2-2V | 10.0 | | | | |
| 17 | BCH-32 | 2.0 | | | | |
| 18 | BCH-52 | 2.0 | | | | |
| Σ | | 100.0 | | | | |

Composition and properties liquid crystal mixture M-7

Composition

| Compound No. | Abbreviation | Conc./ mass-% | Physical Properties | | | |
|---|---|---|---|---|---|---|
| 1 | GUQGU-3-T | 10.0 | T(N,I) | = | —° C. | |
| 2 | GUQGU-4-T | 10.0 | $n_o$(20° C., 589 nm) | = | — | |
| 3 | GUQGU-5-T | 10.0 | $n_e$(20° C., 589 nm) | = | — | |
| 4 | GUUGU-3-N | 10.0 | Δn(20° C., 589 nm) | = | — | |
| 5 | GUQU-2-N | 11.0 | $\varepsilon_\perp$(20°, 1 kHz) | = | — | |
| 6 | GUQU-3-N | 11.0 | Δε (20°, 1 kHz) | = | — | |
| 7 | GUQU-5-N | 11.0 | | | | |
| 8 | DPGU-4-F | 5.0 | | | | |
| 9 | PUQGU-3-T | 11.0 | | | | |
| 10 | PUQGU-5-T | 11.0 | | | | |
| Σ | | 100.0 | | | | |

Formulation

In all the examples reported here the following procedure for formulation is followed.

The solid materials are weighed out. After all components have been added a magnetic stirring flea is placed into the sample vial. The sample is then mixed for 12 hour to ensure full dispersion of the particles in the liquid crystalline component. The formulation is then placed in a vacuum oven to degas fully before testing.

EXAMPLES

Example 1

A commercially available porous PMMA particles (0.1494 g, ε=3.0) is dispersed in M1 (0.3633 g, Δε=11.5) following the method described above. Once formulated this sample is then tested following the method described in Force Gauge Measurements.

Example 2

A commercially available porous PMMA particles (0.1456 g, ε=3.0) is dispersed in M2 (0.3543 g, Δε=55) following the method described above.

Once formulated this sample is then tested following the method described in Force Gauge Measurements.

Example 3

A commercially available porous PMMA particles (0.1462 g, ε=3.0) is dispersed in M3 (0.3541 g, Δε=200) following the method described above. Once formulated this sample is then tested following the method described in Force Gauge Measurements.

Example 4

A commercially available porous PMMA particles (0.1480 g, ε=3.0) is dispersed in M4 (0.3579 g, Δε=360) following the method described above. Once formulated this sample is then tested following the method described in Force Gauge Measurements.

Example 5

A commercially available porous PMMA particles (0.1444 g, ε=3.0) is dispersed in M5 (0.3641 g, Δε=500) following the method described above. Once formulated this sample is then tested following the method described in Force Gauge Measurements.

Example 6

A commercially available Lithium polymethacrylate (LiPMAC, 0.1490 g) is dispersed in M6 (0.3529 g, Δε=400) following the method described above. Once formulated this sample is then tested following the method described in Force Gauge Measurements.

Example 7

A commercially available porous Lithium polymethacrylate (LiPMAC, 0.0846 g) is dispersed in M7 (0.2017 g, Δε=400) with the dispersant Tegorad 2800 (0.0014 g) following the method described above. Once formulated this sample is then tested following the method described in Force Gauge Measurements.

Example 8

A commercially available Styrene particles (0.0353 g, ε=2.5) is dispersed M4 (0.2258 g, Δε=360) following the method described above. Once formulated this sample is then tested following the method described in Force Gauge Measurements.

Example 9

A commercially available Amorphous Si particles (0.0371 g, ε=3.9) is dispersed in M4 (0.2198 g, Δε=360) following the method above. Once formulated this sample is then tested following the method described in Force Gauge Measurements.

Example 10

A commercially available titanium dioxide particles (0.0362 g, ε=110) is dispersed in M4 (0.2258 g, Δε=360) following the method described above. Once formulated this sample is then tested following the method described in Force Gauge Measurements.

Force Gauge Measurements

The force gauge measurements were taken using a Sauter FH-2 force gauge mounted on its commercially available test stand. This allowed the force gauge to be lowered into a purpose built high voltage sample chamber. The sample chamber is mounted onto a motorized labjack (L490MZ/M) which provided a means to translate the sample at micrometer precision.

The sample to be tested is placed onto a glass substrate (held in the high voltage sample chamber) with interdigitated ITO electrodes. Once the sample is deposited a thin plastic substrate is placed onto to prevent contamination of the force gauge probe.

The process to collect the data is as follows;
1. The probe is lower such that it is in contact with the plastic substrate.
2. An in-house program is initiated to log the data given by the force gauge.
3. The motorized labjack is raised a total of 100 microns in 10 micron steps where there is a 10 s delay between each step.
4. After the 10th step the force gauge is left in place for 100 s to record the equilibrium behaviour.
5. The data logging is stopped
6. The force gauge is raised
7. Using an insulated blunt rod the sample is probe in order to ensure that it returns to an equilibrium disordered state.

This process is repeated in total 6 times; 3 times where no voltage is applied to the sample and 3 time where a high voltage is applied.

When the voltage is applied the formulation experiences an electric field of 3.75 V μm$^{-1}$.

Force Gauge Data

The following table shows the collected data of the force gauge measurements.

| No. | Particle Type | Conc. [% wt] | ε | Mixture | Δε | Ave ER response [N] |
|---|---|---|---|---|---|---|
| 1 | Porous PMMA | 30 | 3 | M1 | 11.5 | 0.086 |
| 2 | Porous PMMA | 30 | 3 | M2 | 55 | 0.060 |
| 3 | Porous PMMA | 30 | 3 | M3 | 200 | 0.028 |
| 4 | Porous PMMA | 30 | 3 | M4 | 360 | 0.035 |
| 5 | Porous PMMA | 30 | 3 | M5 | 500 | 0.053 |
| 6 | LiPMAC | 30 | — | M6 | 8.3 | 0.033 |
| 7 | LiPMAC | 30 | — | M7 | 400 | 0.064 |
| 8 | Styrene | 15 | 2.5 | M4 | 360 | 0.054 |
| 9 | Amorph. Si | 15 | 3.9 | M4 | 360 | 0.261 |
| 10 | TiO$_2$ | 15 | 110 | M4 | 360 | 0.282 |

The invention claimed is:

1. An electro-rheological fluid comprising particles of at least one inorganic or organic material suspended in a polar liquid crystalline medium exhibiting a dielectrically anisotropy of ≥5,
wherein said liquid-crystalline medium comprises one or more mesogenic compounds selected formulae I and/or I*:

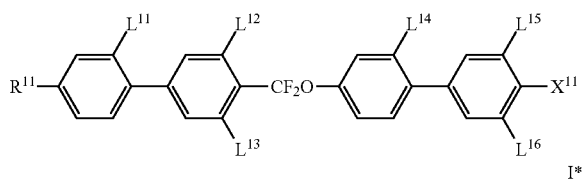

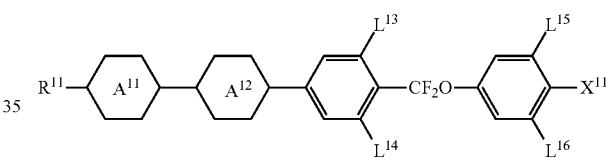

wherein
L$^{11}$ to L$^{16}$ are independently of each other H or F,

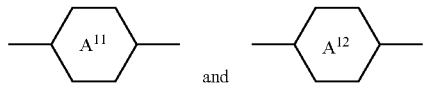

are independently of each other,

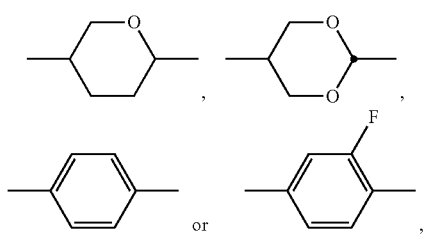

R$^{11}$ is alkyl group, which is straight chain or branched, is unsubstituted, mono- or poly-substituted by F, Cl or CN, preferably by F, and in which one or more CH$_2$ groups are each optionally replaced, in each case independently from one another, by —O—, —S—, —NR$^{O1}$—, —SiR$^{O1}$R$^{O2}$—, —CO—, —COO—, —OCO—, —OCO—O—, —S—CO—, —CO—S—, —CY$^{01}$=CY$^{02}$— or —C≡C— in such a manner that O and/or S atoms are not linked directly to one another, Y$^{01}$ and Y$^{02}$ are, independently of each other, F, Cl, or CN, and alternatively one of Y$^{01}$ and Y$^{02}$ can be H, R$^{01}$ and R$^{02}$ are, independently of each other, H, or alkyl with 1 to 12 C-atoms, and X$^{11}$ halogen, CN, a mono-, di- or polyhalogenated alkyl-, or alkoxy group having 1 to 6 C-atoms or a mono-, di- or polyhalogenated alkenyl group having 2 to 6 C-atoms.

2. The electro-rheological fluid according to claim 1, wherein the amount of particles of the inorganic or organic material in the electro-rheological fluid as a whole is in the range from 5 to 70% wt.

3. The electro-rheological fluid according to claim 1, wherein the size of the particles of the inorganic or organic material is in the range from 1 nm to 1000 nm.

4. The electro-rheological fluid according to claim 1, wherein said particles are of at least one inorganic material selected from amorphous silicon and TiO$_2$.

5. The electro-rheological fluid according to claim 1, wherein said particles are of at least one organic material selected from porous poly(methyl methacrylate, lithium polymethacrylate and styrene.

6. The electro-rheological fluid according to claim 1, wherein said fluid comprises particles of at least one inorganic material suspended in said polar liquid crystalline medium.

7. The electro-rheological fluid according to claim 1, wherein said fluid comprises particles of at least one organic material suspended in said polar liquid crystalline medium.

8. The electro-rheological fluid according to claim 1, wherein the amount of said particles in the electro-rheological fluid as a whole is in the range from 5 to 70% wt.

9. The electro-rheological fluid according to claim 1, wherein the amount of said liquid-crystalline medium in the electro-rheological fluid as a whole is in the range from 2 to 95% wt.

10. The electro-rheological fluid according to claim 1, wherein said one or more mesogenic compounds of formula I and/or I* are selected from compounds of its sub-formulae I-1 and I-2:

I-1

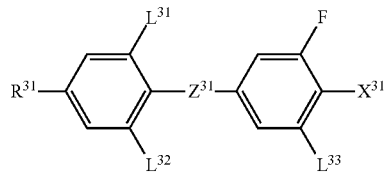

I-2

11. The electro-rheological fluid according to claim 10, wherein said liquid-crystalline medium further comprises one or more mesogenic compounds of formula III:

III wherein

L$^{31}$ to L$^{33}$ are independently of one another H or F,

Z$^{31}$ is —COO— or —CF$_2$O—,

R$^{31}$ is an alkyl group, which is straight chain or branched, is unsubstituted, mono- or poly-substituted by F, Cl or CN, preferably by F, and in which one or more CH$_2$ groups are each optionally replaced, in each case independently from one another, by —O—, —S—, —NR$^{01}$—, —SiR$^{01}$R$^{02}$—, —CO—, —COO—, —OCO—, —OCO—O—, —S—CO—, —CO—S—, —CY$^{01}$=CY$^{02}$— or —C≡C— in such a manner that O and/or S atoms are not linked directly to one another, Y$^{01}$ and Y$^{02}$ are, independently of each other, F, Cl or CN, and alternatively one of Y$^{01}$ and Y$^{02}$ can be H, R$^{01}$ and R$^{02}$ are, independently of each other, H or alkyl with 1 to 12 C-atoms, and X$^{31}$ denotes halogen, CN, a mono- or polyhalogenated alkyl-, or alkoxy group having 1 to 6 C-atoms or a mono- or polyhalogenated alkenyl group having 2 to 6 C-atoms.

12. The electro-rheological fluid according to claim 11, wherein said one or more mesogenic compounds of formula III are selected from compounds of formulae III-1 and/or III-2

III-1

III-2 wherein R$^{31}$, L$^{31}$ to L$^{33}$ and X$^{31}$ have the meanings given in claim 11.

13. The electro-rheological fluid according to claim 10, wherein R$^H$ is n-alkyl.

14. The electro-rheological fluid according to claim 10, wherein the concentration of the compounds of formulae I-1 and/or I-2 is in the range from 0.5% or more to 90% or less.

15. The electro-rheological fluid according to claim 10, wherein the concentration of the compounds of formulae I-1 and/or I-2 is in the range from 1% or more to 80 or less.

16. The electro-rheological fluid according to claim 1, wherein said liquid crystal medium comprises one or more mesogenic compounds selected formula I.

17. The electro-rheological fluid according to claim 1, wherein said liquid crystal medium comprises one or more mesogenic compounds selected formula I*.

18. The electro-rheological fluid according to claim 17, wherein

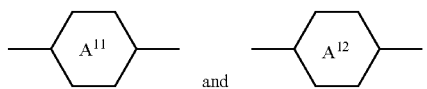

and are independently of each other,

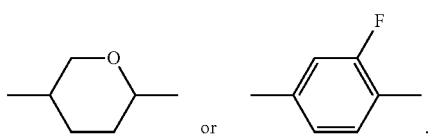

or

19. The electro-rheological fluid according to claim 17, wherein said one or more mesogenic compounds of formula I are selected from sub-formulae I*-1 to I*-8:

I*-1
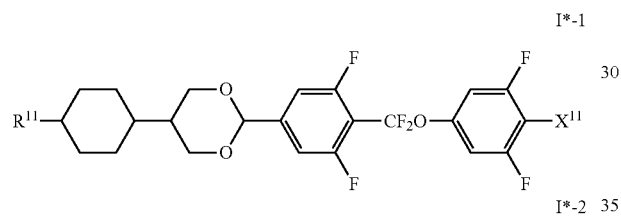

I*-2
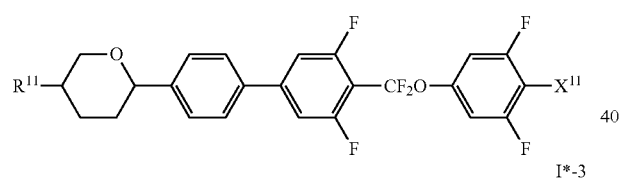

I*-3
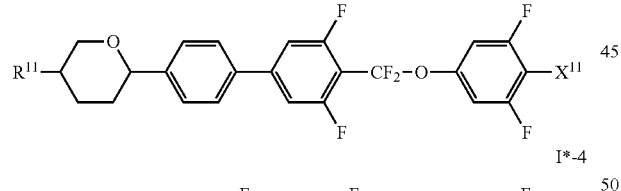

I*-4
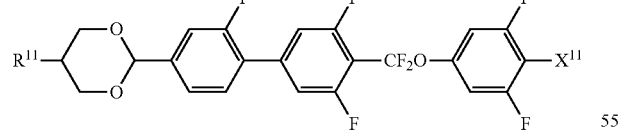

wherein $R^{11}$ and $X^{11}$ are as defined in claim 17.

20. The electro-rheological fluid according to claim 19, wherein the concentration of the compounds of formulae I*-5 and/or I*-6 and/or I*-8 is in the range from 0.5% or more to 90% or less.

21. The electro-rheological fluid according to claim 19, wherein the concentration of the compounds of formulae I*-5 and/or I*-6 and/or I*-8 is in the range from 1% or more to 80% or less.

22. The electro-rheological fluid according to claim 1, wherein $X^{11}$ is F, Cl, CN, $CF_3$, $CHF_2$, $OCF_3$, $OCFHCF_3$, $OCFHCHF_2$, $OCF_2CH_3$, $OCF_2CHF_2$, $OCF_2CF_2CHF_2$, $OCFHCF_2CF_3$, $OCFHCF_2CHF_2$, $OCF_2CF_2CF_3$, $OCF_2CF_2CClF_2$, $OCClFCF_2CF_3$ or $CH{=}CF_2$.

23. The electro-rheological fluid according to claim 1, wherein the concentration of the compounds of formulae I and/or I* is in the range from 0.5% or more to 90% or less.

24. The electro-rheological fluid according to claim 1, wherein the concentration of the compounds of formulae I and/or I* is in the range from 1% or more to 80% or less.

25. The electro-rheological fluid according to claim 1, wherein said liquid-crystalline medium further comprises one or more mesogenic compounds of formula II II
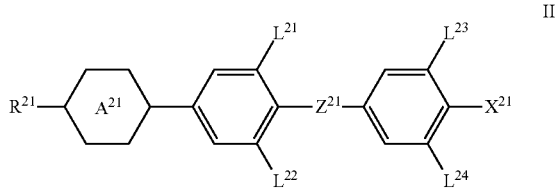

$L^{21}$ to $L^{24}$ are independently of each other H or F, $R^{21}$ is alkyl group, which is straight chain or branched, is unsubstituted, mono- or poly-substituted by F, Cl or CN, preferably by F, and in which one or more $CH_2$ groups are each optionally replaced, in each case independently from one another, by —O—, —S—, —NR$^{01}$—, —SiR$^{01}$R$^{02}$—, —CO—, —COO—, —OCO—, —OCO—O—, —S—CO—, —CO—S—, —CY$^{01}$=CY$^{02}$— or —C≡C— in such a manner that O and/or S atoms are not linked directly to one another,

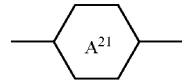

denotes a diradical group selected from:
  a) the group consisting of trans-1,4-cyclohexylene, 1,4-cyclohexenylene and 1,4'-bicyclohexylene, in which, in addition, one or more non-adjacent $CH_2$ groups may each be replaced by —O— or —S— and in which, in addition, one or more H atoms may each be replaced by F, and
  b) the group consisting of 1,4-phenylene and 1,3-phenylene, in which, in addition, one or two CH groups may be replaced by N and in which, in addition, one or more H atoms may be replaced by F, $Z^{21}$ is —COO—, —OCO— or —CF$_2$O—, and $X^{21}$ denotes halogen, CN, a mono- or polyhalogenated alkyl-, or alkoxy group having 1 to 6 C-atoms or a mono- or polyhalogenated alkenyl group having 2 to 6 C-atoms.

* * * * *